United States Patent [19]
Koga et al.

[11] Patent Number: 5,617,234
[45] Date of Patent: Apr. 1, 1997

[54] MULTIWAVELENGTH SIMULTANEOUS MONITORING CIRCUIT EMPLOYING ARRAYED-WAVEGUIDE GRATING

[75] Inventors: Masafumi Koga; Mitsuhiro Teshima, both of Yokosuka; Hitoshi Obara; Ken'ichi Sato, both of Yokohama, all of Japan

[73] Assignee: Nippon Telegraph & Telephone Corporation, Tokyo, Japan

[21] Appl. No.: 531,980

[22] Filed: Sep. 21, 1995

[30] Foreign Application Priority Data

Sep. 26, 1994 [JP] Japan .................................. 6-230020
Jan. 11, 1995 [JP] Japan .................................. 7-002913

[51] Int. Cl.$^6$ ........................................................ H04S 14/02
[52] U.S. Cl. ......................... 359/131; 359/130; 359/110; 359/161; 385/37
[58] Field of Search .............................. 359/110, 115, 359/124, 130, 131, 132, 161, 174; 385/37, 24, 39; 356/73.1

[56] References Cited

U.S. PATENT DOCUMENTS

| | | | |
|---|---|---|---|
| 5,414,548 | 5/1995 | Tachikawa et al. | 359/124 |
| 5,440,416 | 8/1995 | Cohen et al. | 359/127 |
| 5,532,864 | 7/1996 | Alexander et al. | 359/177 |
| 5,546,483 | 8/1996 | Inoue et al. | 359/110 |
| 5,552,919 | 9/1996 | Majima et al. | 359/110 |

FOREIGN PATENT DOCUMENTS

| | | | |
|---|---|---|---|
| 2-41043 | 2/1990 | Japan | H04B 10/04 |
| 3-21936 | 1/1991 | Japan | H04B 10/04 |
| 3-78335 | 4/1991 | Japan | H04B 10/04 |
| 5-95153 | 4/1993 | Japan | H04B 10/04 |
| 07007212 | 1/1995 | Japan | H01S 3/133 |

*Primary Examiner*—Wellington Chin
*Assistant Examiner*—Rafael Bacares
*Attorney, Agent, or Firm*—Spencer & Frank

[57] ABSTRACT

A multiwavelength simultaneous monitoring circuit capable of precise discrimination of wavelengths of a WDM (Wavelength Division Multiplexed) signal including multiplexed wavelength waves, and suitable for optical integrated circuits having large resistance to vibration. It includes a reference optical source, an AWG (Arrayed-waveguide grating) having periodic center transmission wavelength (or crossover wavelengths) corresponding to the wavelength spacing between multiplexed waves of the WDM signal, a first wavelength error detector for generating a wavelength error signal of an RF signal (reference optical signal) with respect to a zero-cross wavelength on the basis of a ratio between the levels of the RF signal outputted from two output waveguides of the AWG, a control circuit for locking the zero-cross wavelength to the wavelength of the RF signal in response to the wavelength error signal, and a second wavelength error detector for generating wavelength error signals of the multiplexed waves of the WDM signal by detecting signal levels of respective wavelength signals of the WDM signal outputted from each pair of output ports of the AWG.

41 Claims, 35 Drawing Sheets

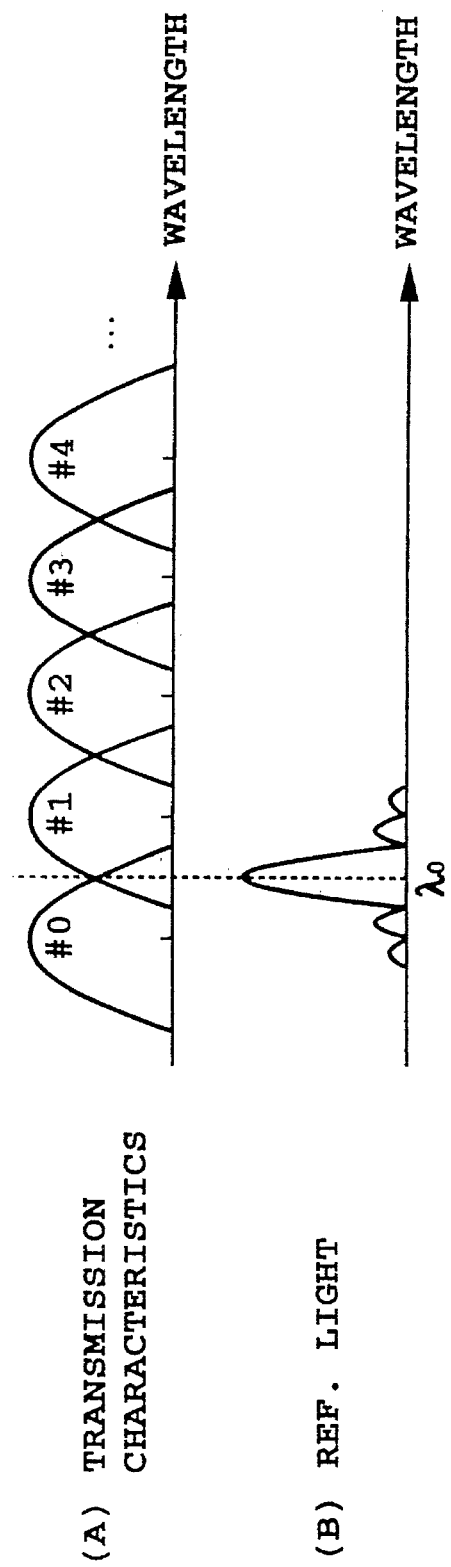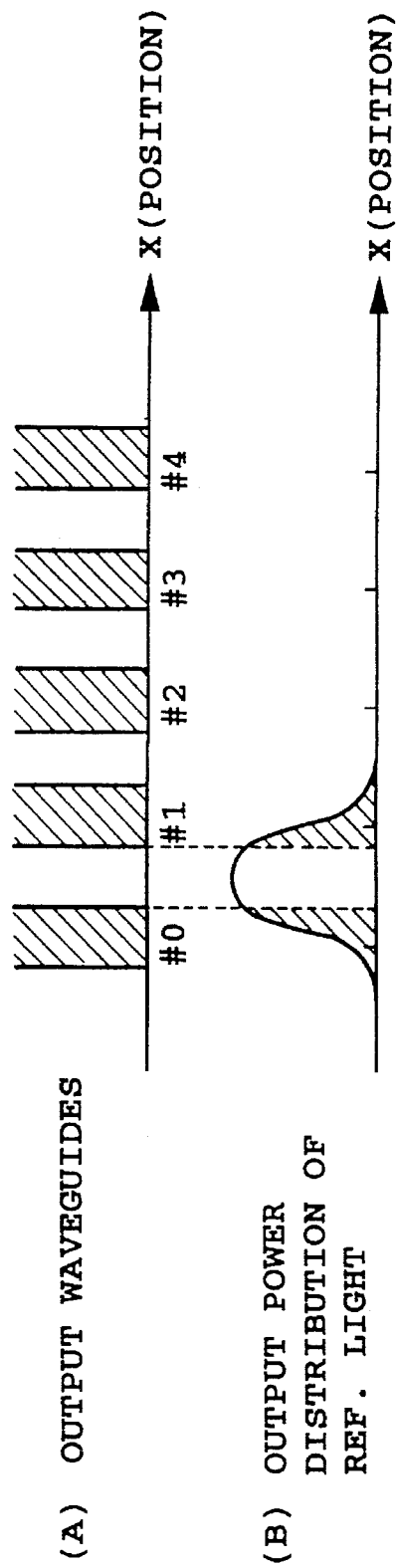
FIG. 16A
FIG. 16B

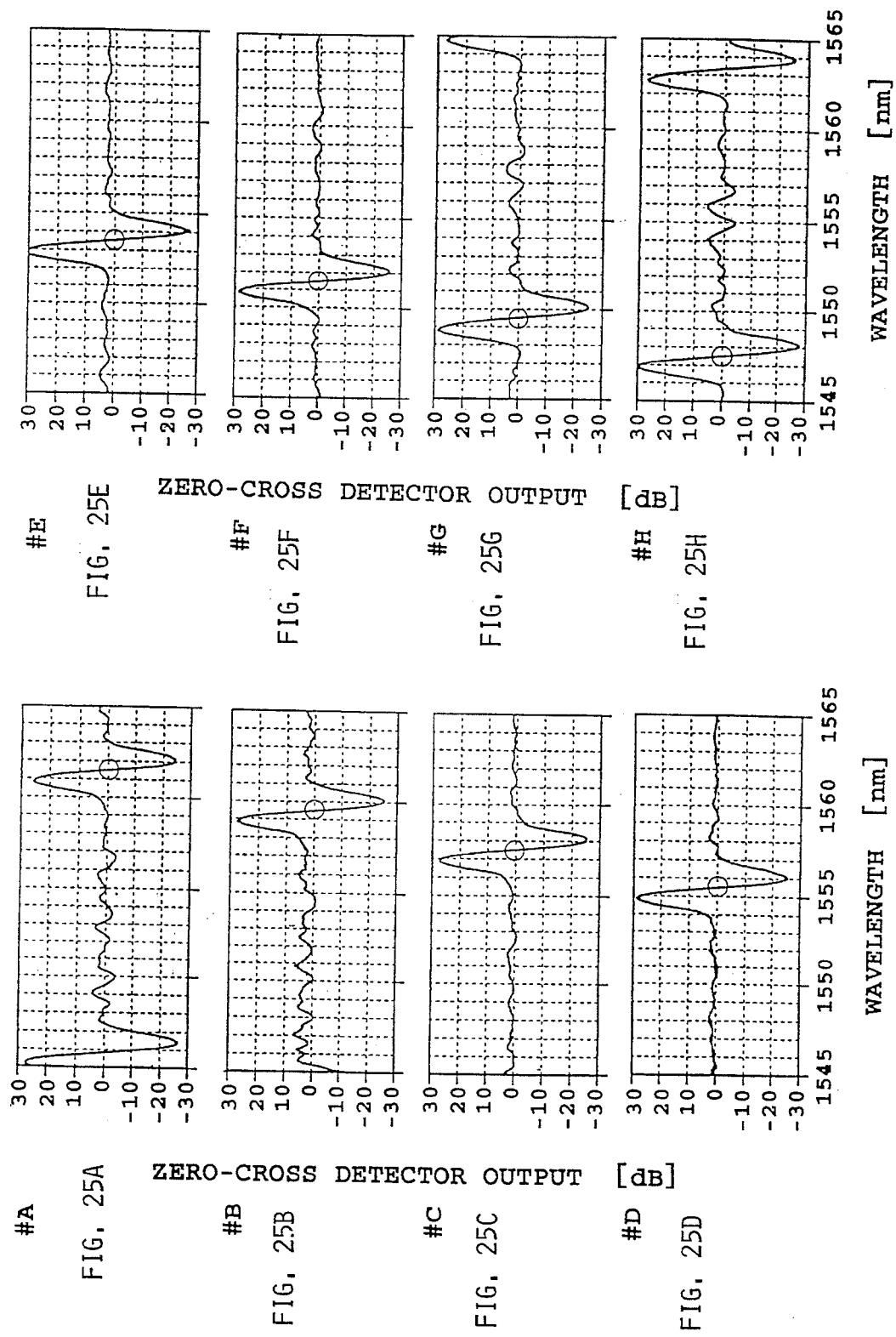

MULTIWAVELENGTH SIMULTANEOUS MONITORING CIRCUIT EMPLOYING ARRAYED-WAVEGUIDE GRATING

BACKGROUND OF THE INVENTION

1. Field of the Invention

The present invention relates to a multiwavelength simultaneous monitoring circuit employing arrayed-waveguide grating preferably used as a wavelength meter in optical communication networks using wavelength division multiplexing (WDM) technologies, or as a wavelength discriminator in a stabilizing circuit for wavelength division multiplexing optical sources.

2. Description of Related Art

Optical sources used in WDM networks are chiefly laser diodes whose oscillation wavelengths vary with aging or changes in the ambient temperature. Accordingly, it is necessary to measure the wavelengths of a number of laser diodes simultaneously and accurately.

A conventional multiwavelength monitoring circuit that monitors individual wavelengths of a WDM signal carries out wavelength discrimination by scanning the center transmission wavelength of a scanning optical filter (for example, a scanning Fabry-Perot interferometer) on time basis, and thus converting wavelength errors into time domain values, the wavelength errors corresponding to the differences between the wavelength of the WDM signals and the center wavelength of the optical filters.

FIG. 1 shows a configuration of a conventional multiwavelength monitoring circuit (T. Mizuochi, et al., "622 Mbit/s-Sixteen-Channel FDM Coherent Optical Transmission System Using Two-Section MQW DFB-LDs", The transactions of the Institute of Electronics, Information and Communication Engineers of Japan, B-I, Vol. J77-B-1, No. 5, pp. 294–303, 1994).

In this figure, a reference optical signal R and a WDM signal W are multiplexed through an optical coupler 71, and injected into a scanning Fabry-Perot interferometer 72. The scanning Fabry-Perot interferometer 72 carries out scanning using a sawtooth wave (FIG. 2(a)) generated by a sawtooth generator 76 synchronized with an oscillator 75, and an optical signal whose center wavelength coincides with a center transmission wavelength of the Fabry-Perot interferometer 72 is received by a photodetector 73. The output pulses (FIG. 2(b)) of the photodetector 73 are differentiated by a differentiator 78 to detect peak positions of the output pulses (FIG. 2(c)). The sampling pulses (FIG. 2(d)) are generated by a sampling circuit 79 at the peak positions of the output optical pulses in FIG. 2(b). The sampling pulses and the output of the oscillator 75 (FIG. 2(e)) are inputted into a coherent detector 80 whose output is inputted into a sample-and-hold circuit 81. Since the sawtooth wave and the output signal of the oscillator 75 are synchronized, phases of the output signal of the oscillator 75 can be detected by the sampling pulses. The sample-and-hold circuit 81 holds the detected phases, thus producing an error signal as shown in FIG. 2(f). A selector 74 sequentially outputs relative error signals between the center transmission wavelength of the scanning Fabry-Perot interferometer 72 and the wavelengths of the reference optical signal R and the WDM signal W.

The error signal associated with the reference optical signal R is added by an adder 77 to the sawtooth wave outputted from the sawtooth generator 76, and is applied to the scanning Fabry-Perot interferometer 72, so that the positions of the output pulses of the photodetector 73 associated with the reference optical signal R are controlled to be locked at a correct position. Thus, the center transmission wavelength of the scanning Fabry-Perot interferometer 72 can be stabilized using the wavelength of the reference optical signal R, thereby achieving temperature compensation function for variations in the ambient temperature.

On the other hand, the error signals associated with individual wavelengths of the WDM signal W is negatively fed back to respective optical sources of the WDM signal W to control the injection currents or temperature of the optical sources, thereby locking the wavelengths of the WDM signal W.

The conventional scanning Fabry-Perot interferometer can be implemented in a rather simple optical circuit, although a mechanism for scanning the cavity length with piezoelectric device is required. Furthermore, the scanning Fabry-Perot interferometer has an advantage in that wavelength variations can be monitored in a wide range at a desired resolution by appropriately setting its center transmission wavelength and bandwidth.

It is assumed in the conventional scanning Fabry-Perot interferometer that the displacement of the piezoelectric device and the center transmission wavelength of the interferometer are directly proportional to the voltage applied to the piezoelectric device. The actual displacement of the piezoelectric device, however, is not directly proportional to the applied voltage, but exhibits hysteresis characteristics as illustrated in FIG. 3A. Accordingly, to set the center transmission wavelengths which correspond to the displacement of the piezoelectric device at a fixed interval, it is necessary to apply corrected voltages $V_2'$–$V_5'$ as illustrated by broken lines in FIG. 3B instead of applying equally separated voltages $V_1$–$V_6$.

Thus, the scanning of the center transmission wavelengths cannot be achieved correctly by a linear waveform scanning voltage such as a sawtooth wave in the conventional interferometer. As a result, in the conventional configuration, in which both the sampling and scanning are in synchronism with the same clock pulses, accurate wavelength discrimination in a wide wavelength range is difficult, and hence, it is impossible to achieve accurate monitoring of a WDM signal containing light signals of multiple wavelengths separated at a given interval.

SUMMARY OF THE INVENTION

It is therefore an object of the present invention to provide a multiwavelength simultaneous monitoring circuit employing arrayed-waveguide grating which can achieve high accuracy discrimination of individual wavelengths of a WDM signal including light signals multiplexed at a predetermined wavelength interval (frequency interval), and which is suitable for implementing in the form of optical integrated circuits.

In one aspect of the present invention, there is provided a multiwavelength simultaneous monitoring circuit which controls center transmission wavelengths of a plurality of channels on the basis of a reference optical signal of a predetermined wavelength, and simultaneously monitors wavelength errors of individual optical signals Sk (k=1–N, where N is a positive integer) of a WDM (wavelength division multiplexed) optical signal outputted from the channels, the monitoring circuit comprising:

an AWG (arrayed-waveguide grating) including at least one first channel outputting at least a part of the reference optical signal when the reference optical signal and the WDM signal are inputted, and at least one second channel outputting at least a part of the optical signal Sk for each of the optical signals Sk;

a first photodetecting means for detecting the reference optical signal outputted from the first channel;

a second photodetecting means for detecting the optical signal Sk outputted from the second channel;

control means for stabilizing the center transmission wavelength of the first channel on the basis of an output from the first photodetecting means; and wavelength error detecting means for producing an error signal indicative of a wavelength error of the optical signal Sk on the basis of an output of the second photodetecting means.

The control means may comprise:

modulating means for providing modulation so that the first channel outputs a modulated reference optical signal;

a first coherent detector for coherently detecting the output of the first photodetecting means; and a first detector for detecting a wavelength error of a wavelength of the reference optical signal on the basis of an output of the first coherent detector, wherein the center transmission wavelength of the first channel is stabilized on the basis of an output of the first detector.

The AWG may comprise two first channels associated with the reference optical signal, and two second channels associated with each optical signal Sk of the optical signals Sk, and wherein the monitoring circuit further comprises:

a first comparing means for comparing powers of two optical outputs produced from the first channels; and a second comparing means for comparing powers of two optical outputs produced from the second channels;

and wherein the control means stabilizes the center transmission wavelengths of the first channels on the basis of an output of the first comparing means, and the wavelength error detecting means detects wavelength error of the optical signal Sk on the basis of an output of the second comparing means.

The control means may comprise an offset circuit generating an offset signal indicative of a difference between the wavelength of the reference optical signal and the center transmission wavelength of the first channel associated with the reference optical signal, and wherein the control means adds the offset signal to a difference between a wavelength of the reference optical signal and an actual center transmission wavelength of the first channel to obtain a summing result, and controls so that the center transmission wavelength of the first channel coincides with a predetermined center transmission wavelength on the basis of the summing result.

The modulating means may simultaneously modulate respective channels of the AWG.

The modulating means may modulate the WDM signal and the reference optical signal, and injects a modulated optical signal into at least one of the channels of the AWG.

The wavelength error detecting means may comprise:

a second coherent detector for coherently detecting an output signal of the second photodetecting means; and a second detector for detecting a wavelength error of the optical signal Sk of the WDM signal on the basis of an output of the second coherent detector.

The multiwavelength simultaneous monitoring circuit may further comprise input means for injecting the WDM signal and the reference optical signal simultaneously into one of the channels of the AWG.

The multiwavelength simultaneous monitoring circuit may further comprise input means for injecting the WDM signal and the reference optical signal separately into different channels of the AWG.

The multiwavelength simultaneous monitoring circuit may further comprise input means for splitting a multiplexed signal of the WDM signal and the reference optical signal, and for injecting the split multiplexed signal into separate channels of the AWG.

The two first channels may be adjacent to each other, and the two second channels may be adjacent to each other.

The two first channels may be separated apart by an amount corresponding to an FSR (Free Spectral Range), and the two second channels are separated apart by the amount corresponding to the FSR.

The first comparing means may comprise a logarithmic amplifier, and the second comparing means comprises a logarithmic amplifier.

The first comparing means may comprise an A/D converter and a digital signal processor, and the second comparing means comprises an A/D converter and a digital signal processor.

The first comparing means may comprise a differential photodetector, and the second comparing means comprises a differential photodetector.

With the above-mentioned arrangements, the center transmission wavelength or the crossover wavelength of the reference channel of the AWG (Arrayed-Waveguide Grating) is controlled so that the center transmission wavelength or the crossover wavelength of the reference channel is locked to the wavelength of the reference optical signal. On the other hand, since the relative accuracy of the periodic center transmission wavelengths or the crossover wavelengths of the AWG is extremely high, the transmission characteristics of the entire port of the AWG can be stabilized by locking the center transmission wavelength or the crossover wavelength of the reference channel to the reference wavelength. Detecting the relative wavelength errors of individual wavelengths of the WDM signal in this state can achieve highly accurate, stable wavelength discrimination.

The above and other objects, effects, features and advantages of the present invention will become more apparent from the following description of the embodiments thereof taken in conjunction with the accompanying drawings.

BRIEF DESCRIPTION OF THE DRAWINGS

FIGS. 16A and 16B are diagrams illustrating relationships between transmission characteristics and the reference optical signal in the third embodiment;

FIGS. 24A and 24B are graphs illustrating the periodic assignment of an arrayed-waveguide grating, wherein FIG. 24A illustrates the case when the input optical signal is injected into the input port #1, and FIG. 24B illustrates the case when the input optical signal is injected into the input port #7;

FIGS. 25A–25H are graphs illustrating zero-cross wavelengths of the outputs of respective logarithmic amplifiers when the input optical signal is injected into the input port #1;

FIGS. 30A and 30B are maps illustrating wavelength allocations when the WDM signal and reference optical signal are injected into different input ports, wherein FIG. 30A illustrates the wavelength allocation of the WDM signal, and FIG. 30B illustrates the wavelength allocation of the reference optical signal;

DETAILED DESCRIPTION OF PREFERRED EMBODIMENTS

The invention will now be described with reference to the accompanying drawings.

EMBODIMENT 1

Figure 1:
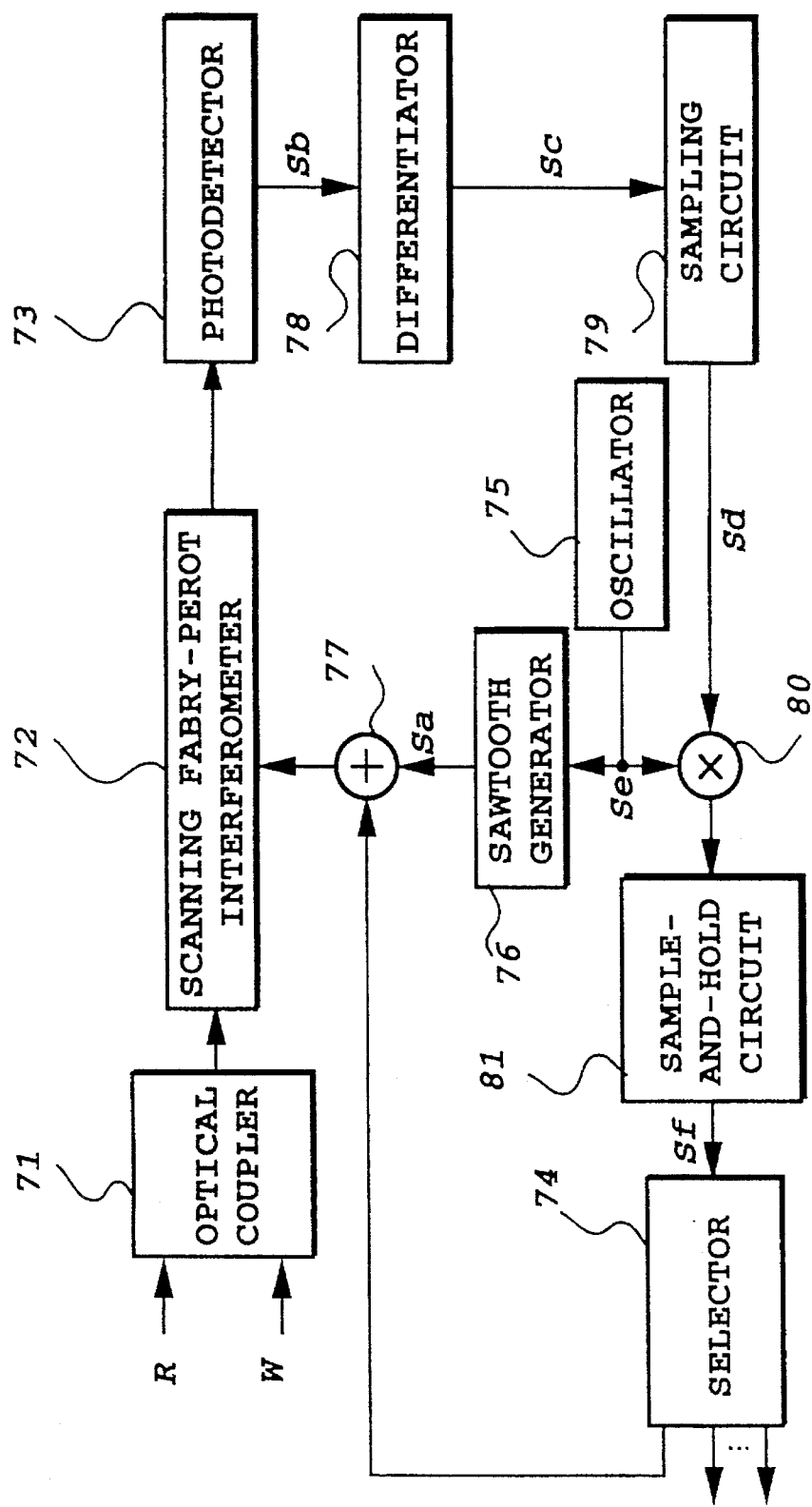
FIG. 1 is a block diagram showing an example of a conventional wavelength monitoring circuit.
Figure 2:
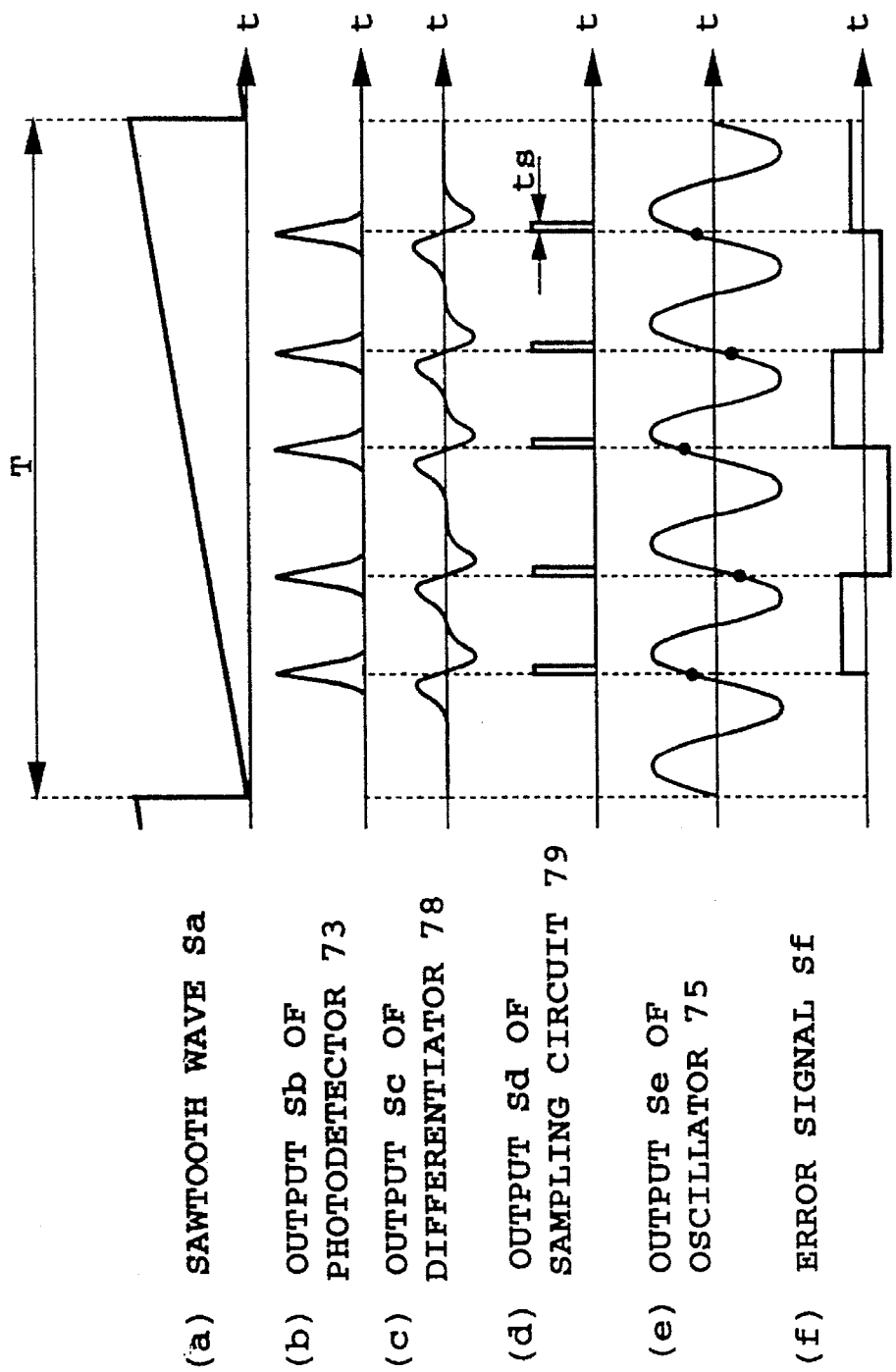
FIG. 2 is a waveform diagram illustrating the operation of the conventional wavelength monitoring circuit.
Figure 3A:
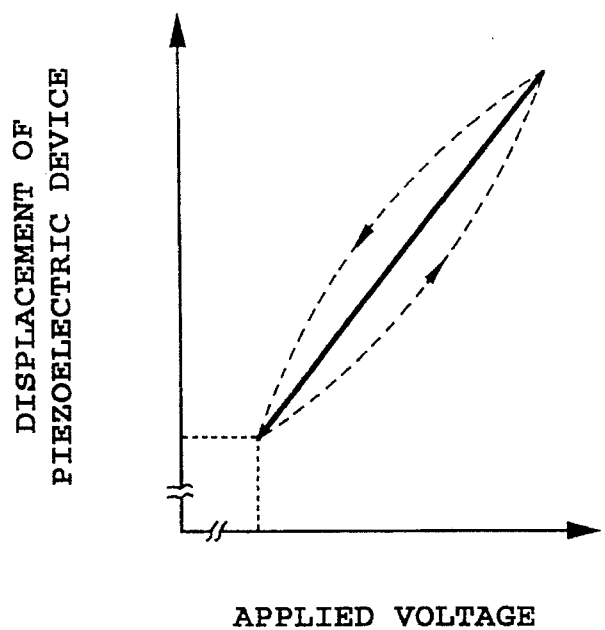
FIGS. 3A and 3B are graphs illustrating relationships between apply voltages to a scanning Fabry-Perot interferometer and displacements of a piezoelectric device and center transmission wavelengths of the Fabry-Perot interferometer.
Figure 3B:
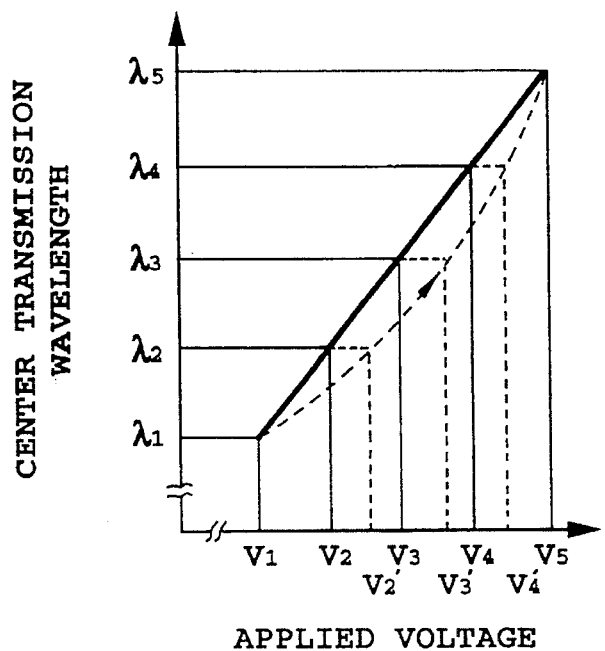
Figure 4:
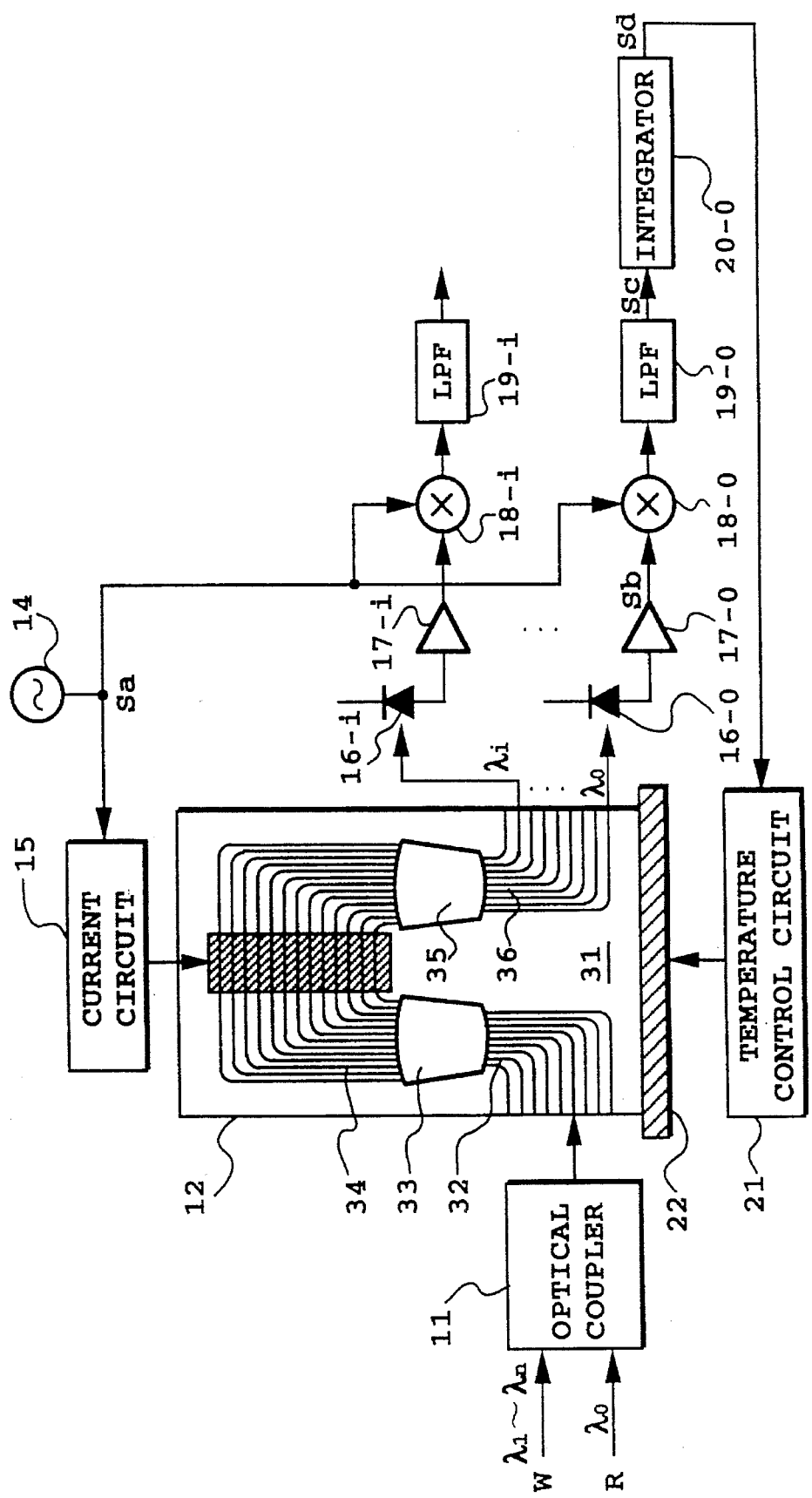
FIG. 4 is a block diagram showing a first embodiment of a multiwavelength simultaneous monitoring circuit in accordance with the present invention.

FIG. 4 shows a configuration of a first embodiment of a multiwavelength simultaneous monitoring circuit in accordance with the present invention.

In this figure, a reference optical signal (wavelength $\lambda_0$) and a WDM signal to be monitored (wavelength $\lambda_1-\lambda_n$) are inputted to a predetermined input waveguide of an AWG (Arrayed-Waveguide Grating) 12 after multiplexed by an optical coupler 11. The AWG 12 includes the following elements which are connected in this order: an input waveguide array 32 formed on a substrate 31; an input concave-slab waveguide 33; a waveguide array 34 including a plurality of waveguides which progressively become longer by a length difference $\Delta L$, an output concave-slab waveguide 35; and an output waveguide array 36. The waveguide array 34 is provided with a heater 13 connected to a current source 15. The current source 15 is supplied with a reference signal Sa outputted from an oscillator 14, and controls the temperature of the heater 13 in response to the reference signal Sa.

Figure 5A:
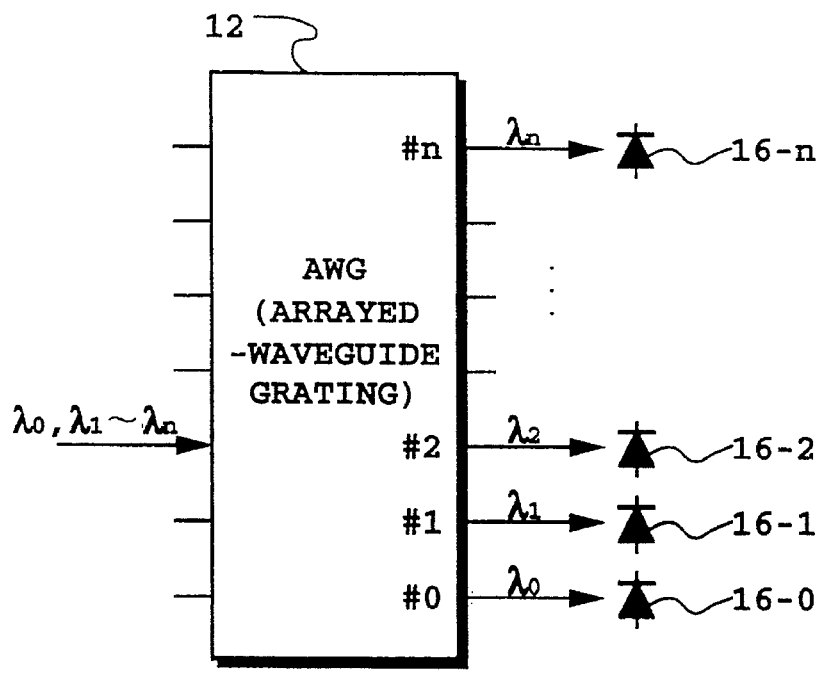
FIG. 5A is a diagram showing a major portion of the first embodiment.

The output waveguides #0–#n of the AWG 12 are connected to photodetectors 16-0 and 16-i (i=1–n) as shown in FIG. 5A. The outputs of the photodetectors 16-0 and 16-i are connected to phase comparators 18-0 and 18-i through amplifiers 17-0 and 17-i, respectively. The phase comparators 18-0 and 18-i are provided with the reference signal Sa outputted from the oscillator 14, and their outputs are inputted to low-pass filters (LPFs) 19-0 and 19-i. The output of the low-pass filter 19-0 is supplied to an integrator 20-0. The output (wavelength error signal Sd) of the integrator 20-0 is fed to a temperature control circuit 21 that controls a Peltier cooler 22 for regulating the temperature of the AWG 12.

Figure 6:
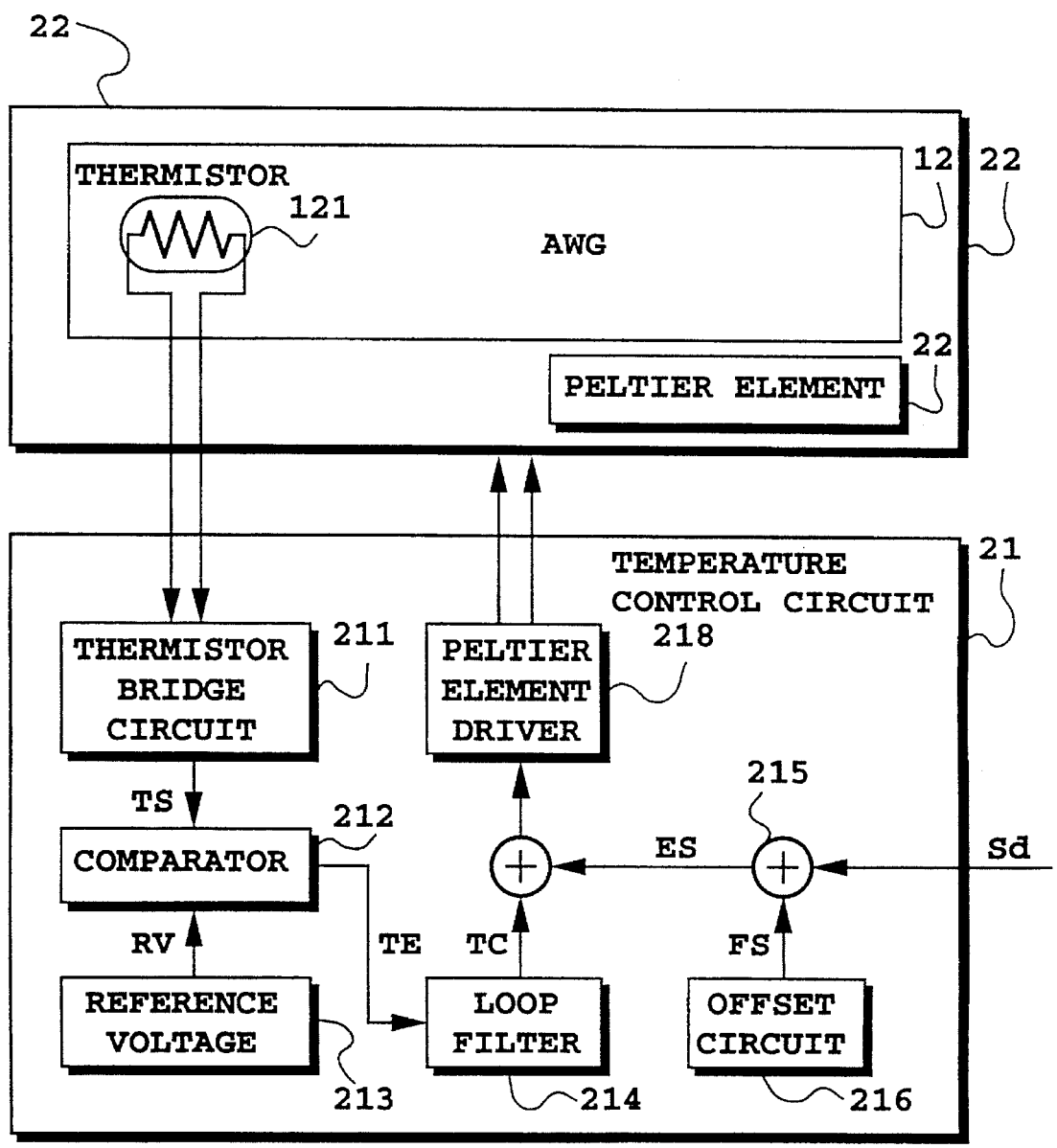
FIG. 6 is a block diagram showing a configuration of a temperature control circuit.

FIG. 6 is a block diagram showing the configuration of a temperature control circuit 21. In this figure, the reference numeral 121 designates a thermistor for detecting the temperature of the AWG 12. The output of the thermistor 121 is fed to a thermistor bridge circuit 211 in the temperature control circuit 21. The thermistor bridge circuit 211 outputs a temperature signal TS corresponding to the temperature of the AWG 12 on the basis of the resistance of the thermistor 121, and supplies it to a first input terminal of a comparator 212. A second input terminal of the comparator 212 is provided with a reference voltage RV from a reference voltage source 213. The comparator 212 compares the temperature signal TS and the reference voltage RV, and outputs an error signal TE between a measured temperature and a set temperature. The error signal is supplied to a loop filter 214 with a predetermined time constant. The loop filter 214 converts the error signal TE to a temperature control signal TC.

On the other hand, the wavelength error signal Sd associated with the reference optical signal is supplied to an adder 215. The wavelength error signal Sd indicates a difference between the wavelength of the reference optical signal and the center transmission wavelength of the channel corresponding to the reference optical signal. When there is a preset offset between the set value of the center transmission wavelength and the reference wavelength, the sum of the wavelength error signal Sd and an offset signal FS indicates the difference between the set center transmission wavelength and the actual center transmission wavelength. The adder 215 adds the wavelength error signal Sd to the offset signal FS supplied from an offset circuit 216, and provides a next adder 217 with an error signal ES. The adder 217 obtains the difference between the error signal ES and the temperature control signal TC, and controls the Peltier cooler 22 through a Peltier element driver 218. By thus using the offset signal indicative of the difference between the set center transmission wavelength of the AWG 12 and the reference wavelength, it becomes possible to control the center transmission wavelengths of the AWG 12 by the reference optical signal with a wavelength different from the set center transmission wavelength.

Figure 5B:
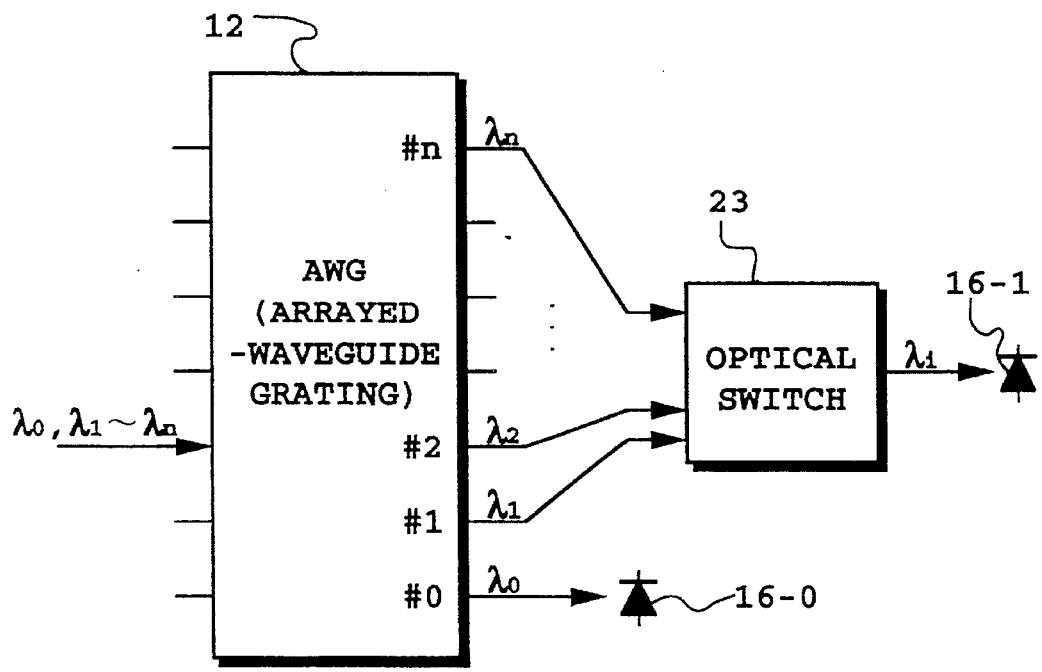
FIG. 5B is a diagram showing a major portion of a variation of the first embodiment.

As shown in FIG. 5B, the photodetectors 16-i connected to the output waveguides #1–#n of the AWG 12 may be replaced by a set of an optical switch 23 and the photodetector 16-1, the optical switch 23 selecting one of the outputs of the output waveguides #1–#n and supplying it to the photodetector 16-1.

Next, the function of the AWG 12 will be described.

An optical signal injected into a predetermined waveguide of the input waveguide array 32 spreads in the input concave-slab waveguide 33 by diffraction, and is guided to the waveguide array 34 disposed perpendicularly to the diffraction surface of the input concave-slab waveguide 33. Since the respective waveguides of the waveguide array 34 are progressively lengthened by an amount of waveguide length difference $\Delta L$, optical signals passing through the waveguides and reaching the output concave-slab waveguides 35 have phase differences corresponding to the waveguide length differences $\Delta L$. Since the phase differences vary in accordance with the wavelengths (optical frequencies), the output concave-slab waveguide 35 focuses through its lensing effect the optical signals on different input terminals of the output waveguide array 36 in accordance with the wavelengths.

Figure 7:
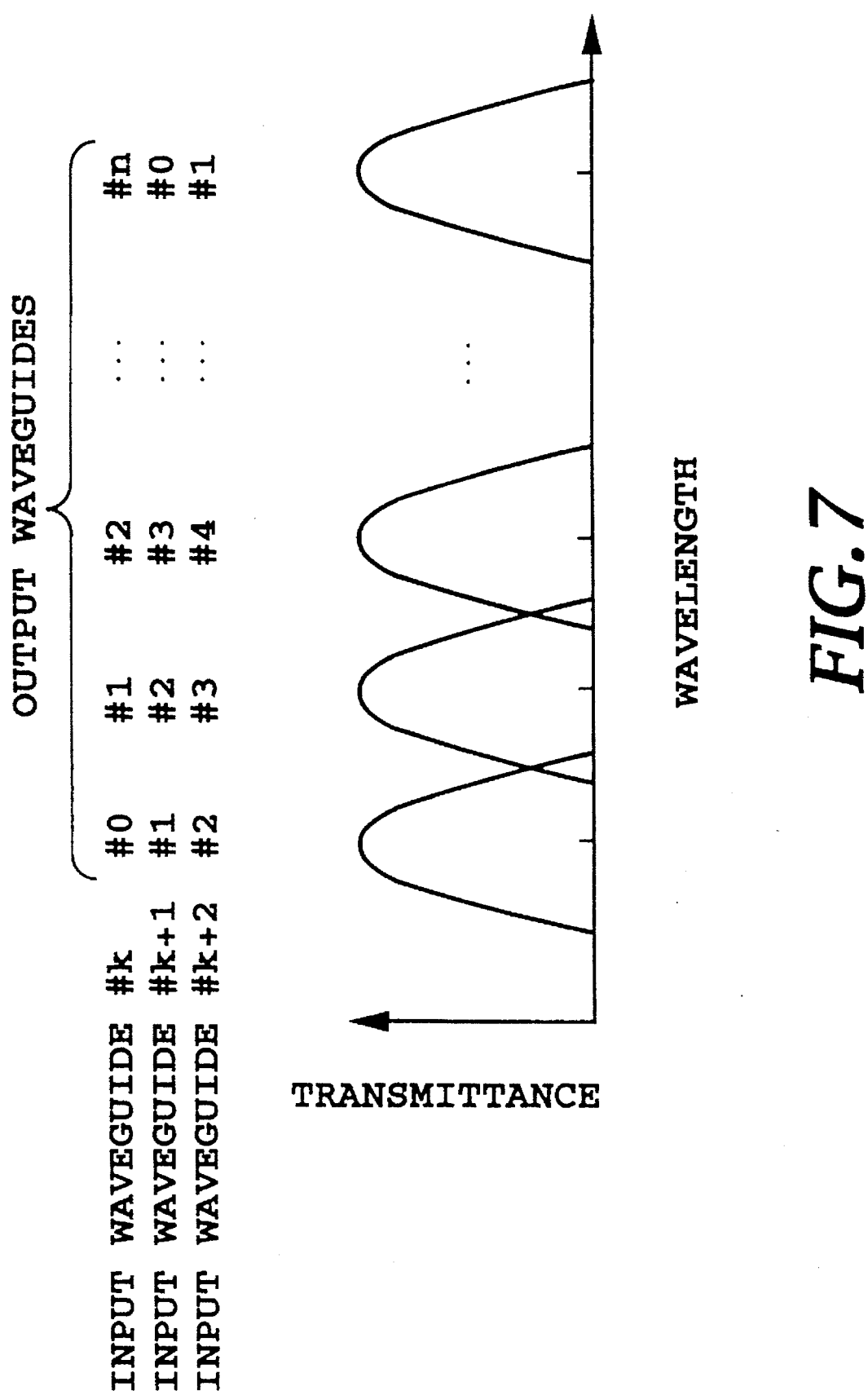
FIG. 7 is a graph illustrating transmission characteristics of an arrayed-waveguide grating.

Thus, the AWG 12 functions as an optical demultiplexer having transmission characteristics as shown in FIG. 7. As shown in FIG. 7, the center transmission wavelengths are spaced at a fixed interval corresponding to the output waveguides. The correspondence between the center transmission wavelengths and the output waveguides periodically shifts by one channel when the input waveguide is shifted by one position.

Figure 8:
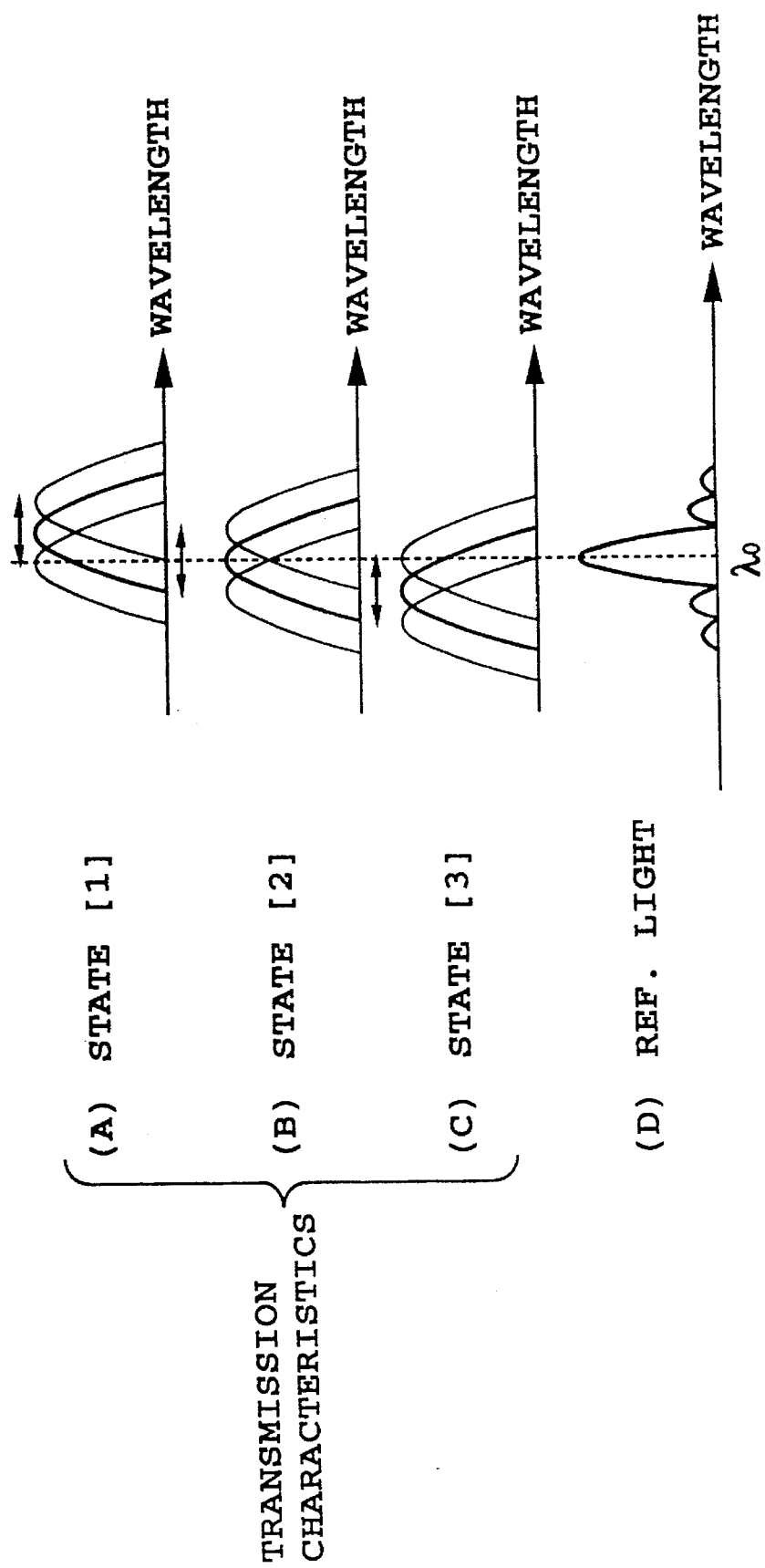
FIGS. 8 and 9 are diagrams illustrating wavelength discrimination of the reference optical signal in the first embodiment, and stabilization of the transmission characteristics.
Figure 10A:
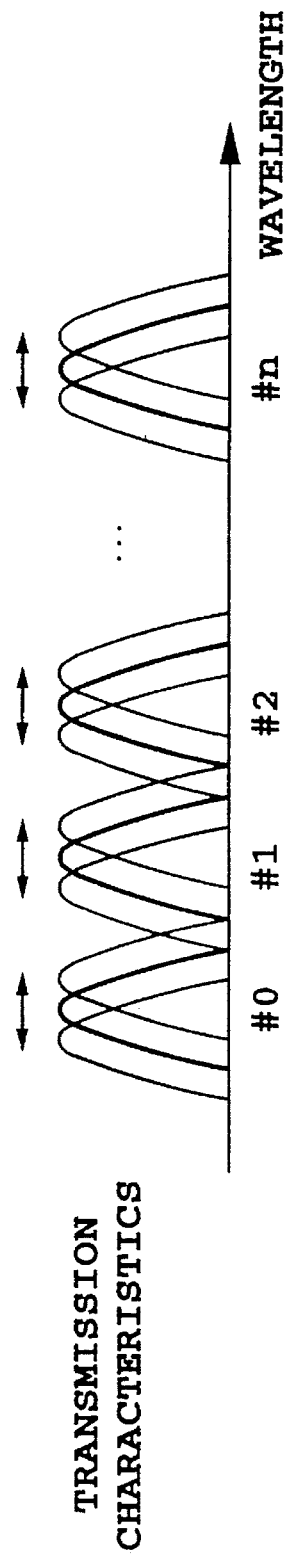
FIGS. 10A and 10B are diagrams illustrating the wavelength discrimination of the WDM signal in the first embodiment.
Figure 10B:
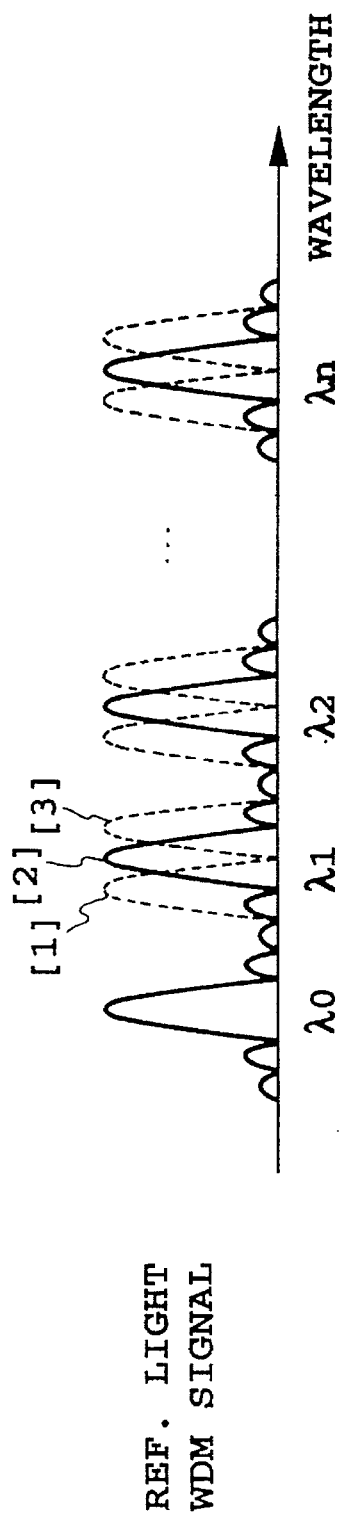

In operating this embodiment, the temperature of the heater 13 for heating the waveguide array 34 is varied in response to the reference signal Sa. This provides the transmission characteristics of the AWG 12 with small vibrations on the wavelength axis as shown in FIGS. 8, 10A and 10B. The small vibrations in turn provides the output optical signals with the variation in power. Thus, carrying out the coherent detection of the variations in power makes it possible to detect wavelength errors between the wavelengths of the input optical signals and the center transmission wavelengths. On the basis of this, the center transmission wavelength of the reference channel is first matched to the reference wavelength, thereby stabilizing the transmission characteristics of the AWG 12.

Figure 9:
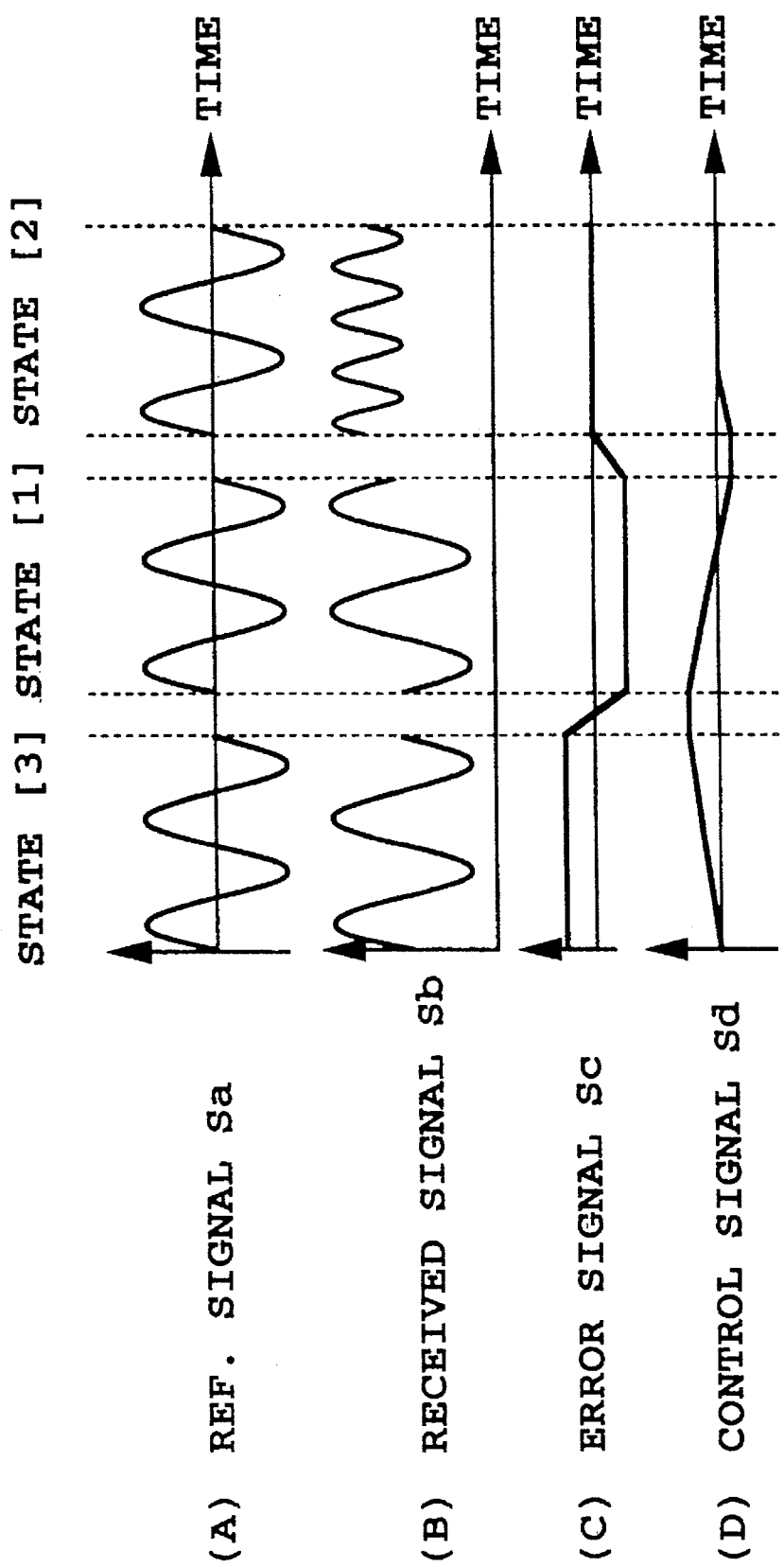

FIGS. 8 and 9 illustrate the operation for discriminating the reference wavelength, and stabilizing the transmission characteristics in the first embodiment.

The reference optical signal is launched from the output waveguide #0 of the AWG 12, and is received by the photodetector 16-0. The output of the photodetector 16-0 is amplified by the amplifier 17-0, and the amplified signal Sb is inputted to the phase comparator 18-0. In this case, the center transmission wavelength of the output waveguide #0 takes one of the three states [1], [2] and [3] with respect to the reference wavelength $\lambda_0$ as shown in FIGS. 8 and 9.

In the state [3], in which the center transmission wavelength of the output waveguide #0 is present on the short wavelength side with respect to the reference wavelength $\lambda_0$, the frequency and the phase of the received signal Sb are the same as those of the reference signal Sa as shown in (A) and (B) of FIG. 9. In contrast, in the state [1], in which the center transmission wavelength is present on the long wavelength side, although the frequency of the received signal Sb is the same as that of the reference signal Sa, the phases of the two signals a and b differ by an amount of $\pi$. In the state [2], in which the reference wavelength equals the center transmission wavelength, the frequency of the received signal Sb is twice that of the reference signal Sa. The received signal Sb undergoes coherent detection in the phase comparator 18-0 using the reference signal Sa, followed by removal of the small vibration component through the lowpass filter 19-0 to extract a signal component, thereby obtaining an error signal Sc corresponding to the relative wavelength difference between the reference wavelength $\lambda_0$ and the center transmission wavelength of the output waveguide #0. The error signal Sc will become positive in the state [3], negative in the state [1], and zero in the state [2].

The error signal Sc is subject to time integration by the integrator 20-0 to obtain a control signal Sd which is fed back to the AWG 12 through the temperature control circuit 21 and the Peltier cooler 22. The transmission characteristics of the AWG 12 can also be varied by the temperature control with the Peltier cooler 22. Thus, the loop for regulating the relative wavelength difference to zero operates, so that the center transmission wavelength of the output waveguide #0 of the AWG 12 can be locked to the reference wavelength $\lambda_0$.

Furthermore, since the relative accuracy between the center transmission wavelengths of the output waveguides

0–#n of the AWG 12 is very high, locking the center transmission wavelength of the output waveguide #0 makes it possible to stabilize the entire transmission characteristics of the AWG 12.

Stabilizing the center transmission wavelengths of the output waveguides #1–#n of the AWG 12 at the wavelengths $\lambda_1, \lambda_2, \ldots, \lambda_n$ of the WDM signal to be monitored makes it possible to detect errors of the individual wavelengths of the WDM signal by coherently detecting the output optical signals from the respective output waveguides. The intervals between adjacent wavelengths of the WDM signal can be equal or not equal. The AWG 12 can handle either cases.

FIGS. 10A and 10B illustrate the wavelength discrimination of the WDM signal in the first embodiment.

Since the transmission characteristics of the AWG 12 is locked to the reference wavelength $\lambda_0$, error signals detected by the coherent detection in the phase comparators 18-1–18-n correspond to the relative wavelength differences between the respective wavelengths $\lambda_1-\lambda_n$ of the WDM signal and the center transmission wavelengths of the output waveguides #1–#n.

For example, the state [1] in FIG. 10B, in which the wavelength $\lambda_1$ shifts to the short wavelength side, is equivalent to the state [1] of FIGS. 8 and 9, in which the center transmission wavelength of the output waveguide #0 shifts to the long wavelength side with respect to the reference wavelength $\lambda_0$. On the other hand, the state [3], in which the optical signal of wavelength $\lambda_1$ shifts to the long wavelength side, is equivalent to the state [3] of FIGS. 8 and 9, in which the center transmission wavelength of the output waveguide #0 shifts to the short wavelength side with respect to the reference wavelength $\lambda_0$. Accordingly, an error signal proportional to fluctuations of the wavelength can be obtained by the coherent detection centered on the state [2] corresponding to the center transmission wavelength $\lambda_1$ of the output waveguide #1. Incidentally, error signals corresponding to respective wavelength differences of the WDM signal can be digitized, or fed back to wavelength control circuits of individual optical sources of the WDM signal. This will be described in more detail with reference to FIG. 32.

Thus, the multiwavelength simultaneous monitoring circuit of this embodiment can discriminate the wavelength errors of the WDM signal to be monitored at high accuracy by utilizing the highly accurate relationships between the center transmission wavelengths of the output waveguides of the AWG 12, and by locking one of the center transmission wavelengths to the reference wavelength $\lambda_0$.

Although the reference optical signal and the WDM signal are multiplexed before injected into a predetermined input waveguide of the AWG 12 in this embodiment, they may be injected into different input waveguides. This enables one of the wavelengths of the WDM signal to be utilized as the reference wavelength, as well. Since the output waveguides shift periodically with the shift of the input waveguide as will be described later, a reference optical signal with a wavelength equal to one of the wavelengths of the WDM signal can be made to emit from the output waveguide #0 by injecting it to an input waveguide different from that of the WDM signal. For example, in the wavelength allocation as shown in FIG. 5A, a reference optical signal with a wavelength $\lambda_1$ or $\lambda_n$ should be injected into an input waveguide adjacent to that of the WDM signal. Thus, the reference optical signal can take any desired wavelength including those of the WDM signal. This will be described in more detail later with reference to FIGS. 29A and 29B.

EMBODIMENT 2

Figure 11:
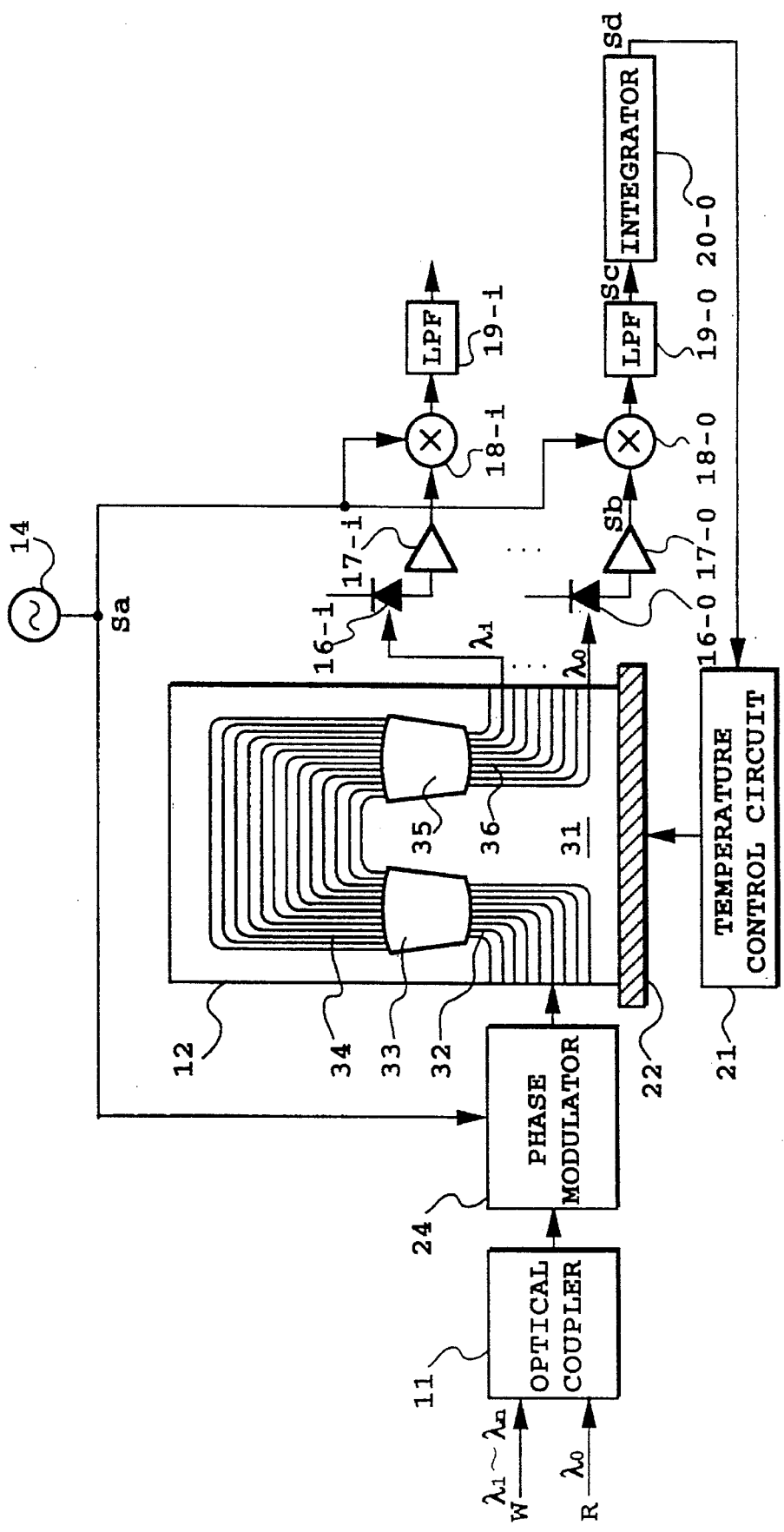
FIG. 11 is a block diagram showing a second embodiment of a multiwavelength simultaneous monitoring circuit in accordance with the present invention.

FIG. 11 is a block diagram showing a second embodiment of the multiwavelength simultaneous monitoring circuit in accordance with the present invention.

Although the transmission characteristics of the AWG 12 are modulated by the reference signal Sa in the first embodiment, an optical signal to be injected into the AWG 12 is frequency modulated by the reference signal Sa in this embodiment.

In FIG. 11, a phase modulator or frequency modulator 24 is provided between the optical coupler 11 and the AWG 12 so as to phase modulate or frequency modulate the reference optical signal R and the WDM signal W by supplying the phase modulator or frequency modulator 24 with the reference signal Sa outputted from the oscillator 14. The remaining portion and the wavelength error detection principle are similar to those of the first embodiment. In the present embodiment, the transmission characteristic of the AWG 12 are kept constant, whereas the reference optical signal R and WDM signal W are provided with small oscillation on the wavelength axis, so that the variation in the power of the received signal Sb is detected by the coherent detection in response to the oscillation, thereby detecting the relative wavelength difference with respect to the center transmission wavelengths. Accordingly, the sign of the error signals of this embodiment has opposite sense as that of the first embodiment.

Figure 12:
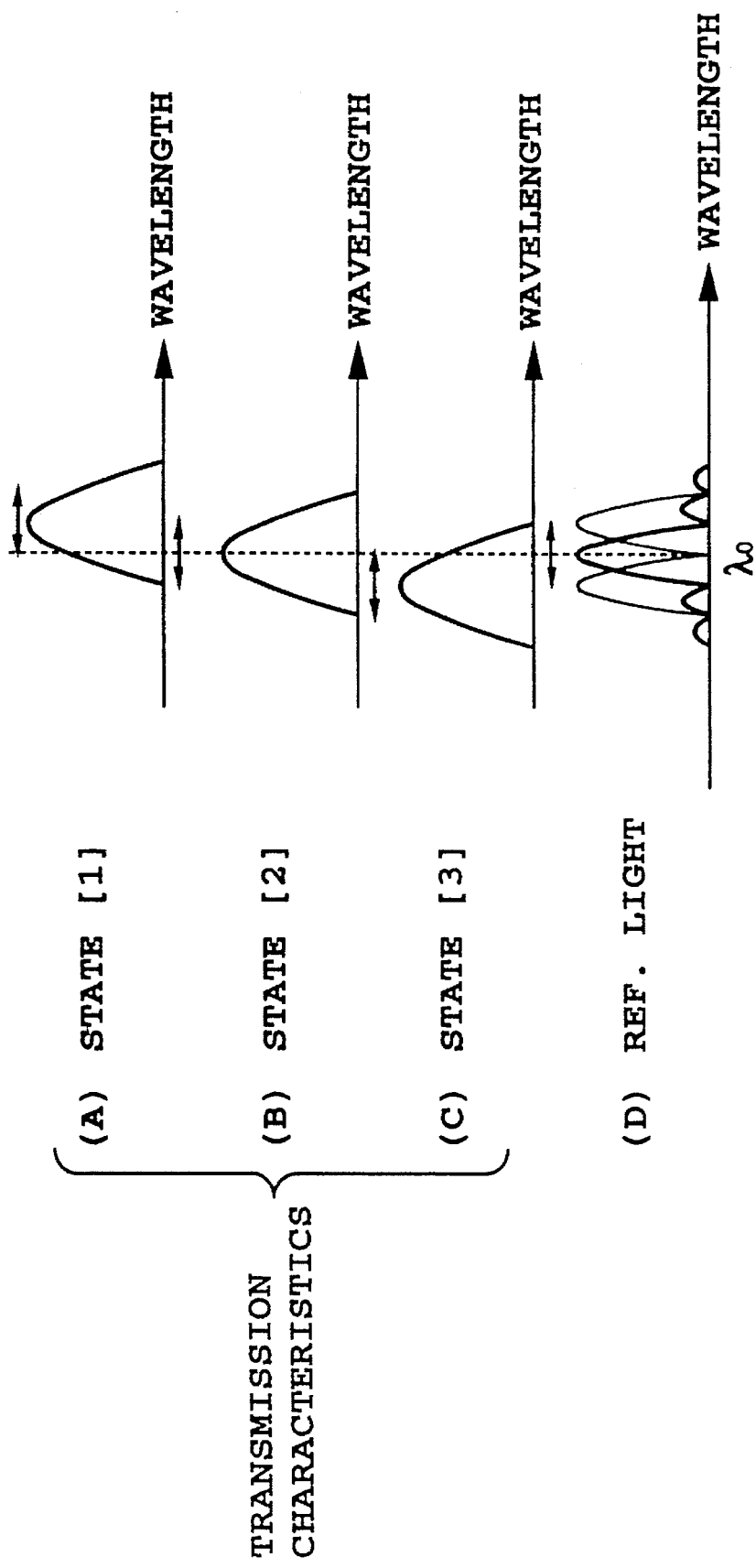
FIGS. 12 and 13 are diagrams illustrating wavelength discrimination of the reference optical signal, and stabilization of the transmission characteristics in the second embodiment.
Figure 13:
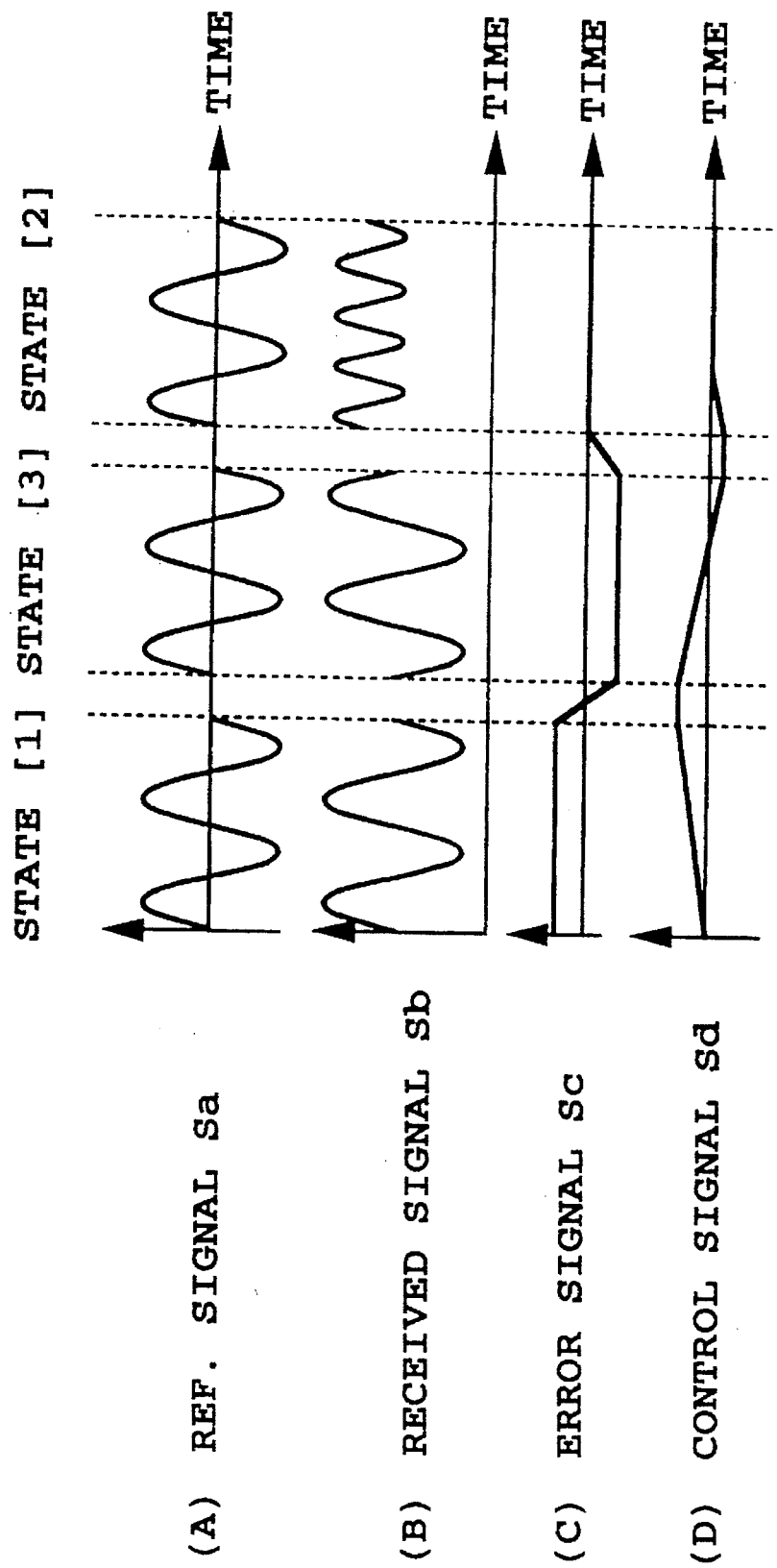

FIGS. 12 and 13 illustrate the wavelength discrimination and the stabilizing operation of the transmission characteristics of the second embodiment.

The center transmission wavelength of the output waveguide #0 takes one of the three states [1], [2] and [3] with respect to the reference wavelength $\lambda_0$. In the state [1], in which the center transmission wavelength of the output waveguide #0 is present on the long wavelength side of the reference wavelength $\lambda_0$, the received signal Sb and the reference signal Sa have the same frequency and the same phase. In the state [3], in which the center transmission wavelength of the output waveguide #0 is present on the short wavelength side of the reference wavelength $\lambda_0$, the received signal Sb and the reference signal Sa have the same frequency and the opposite phase. In the state [2], in which they coincide with each other, the received signal Sb is twice the frequency of the reference signal Sa. The received signal Sb undergoes coherent detection with the phase comparator 18-0 using the reference signal Sa, and then the DC component thereof is extracted by the lowpass filter 19-0. Thus, the error signal Sc is obtained indicative of the relative wavelength difference between the reference wavelength $\lambda_0$ and the center transmission wavelength of the output waveguide #0. The error signal Sc is positive in the state [1], negative in the state [3], and zero in the state [2]. The error signal Sc undergoes time integration by the integrator 20-0, and is converted into the control signal Sd which controls the Peltier cooler 22. As a result, the feedback loop operates to keep the relative wavelength error zero, thereby making it possible to lock the center transmission wavelength of the output waveguide #0 of the AWG 12 to the reference wavelength $\lambda_0$.

The wavelength discrimination of the WDM signal are carried out in a similar manner. Specifically, since the transmission characteristics of the AWG 12 are stabilized by using the reference wavelength $\lambda_0$, the error signals detected by the coherent detection with the phase comparators 18-1–18-n indicate the relative wavelength differences between the respective wavelengths $\lambda_1-\lambda_n$ of the WDM signal and the center transmission wavelengths of the output waveguides #1–#n, respectively.

EMBODIMENT 3

Figure 14A:
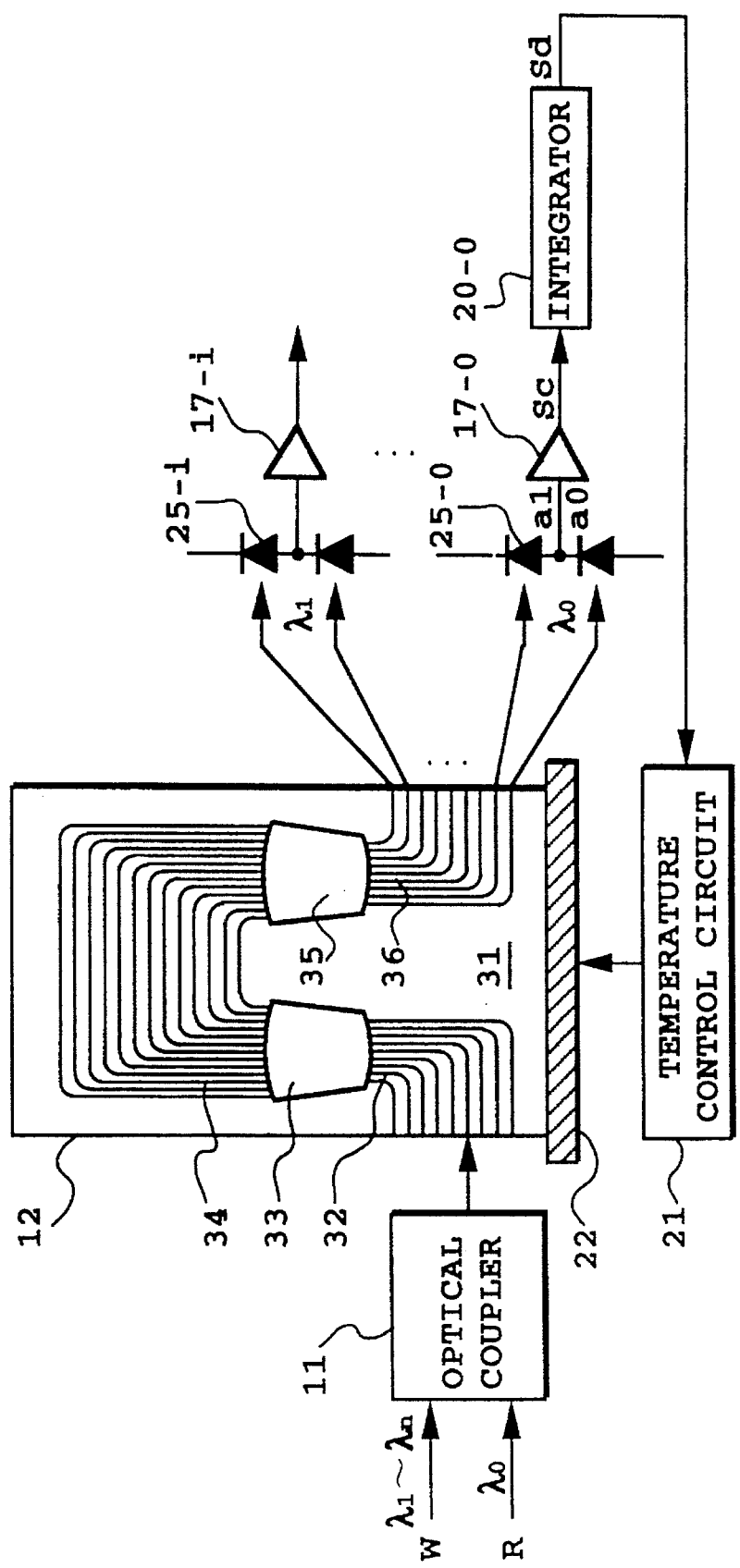
FIG. 14A is a block diagram showing a third embodiment of a multiwavelength simultaneous monitoring circuit in accordance with the present invention.

FIG. 14A is a block diagram showing a third embodiment of the multiwavelength simultaneous monitoring circuit in accordance with the present invention.

Figure 15A:
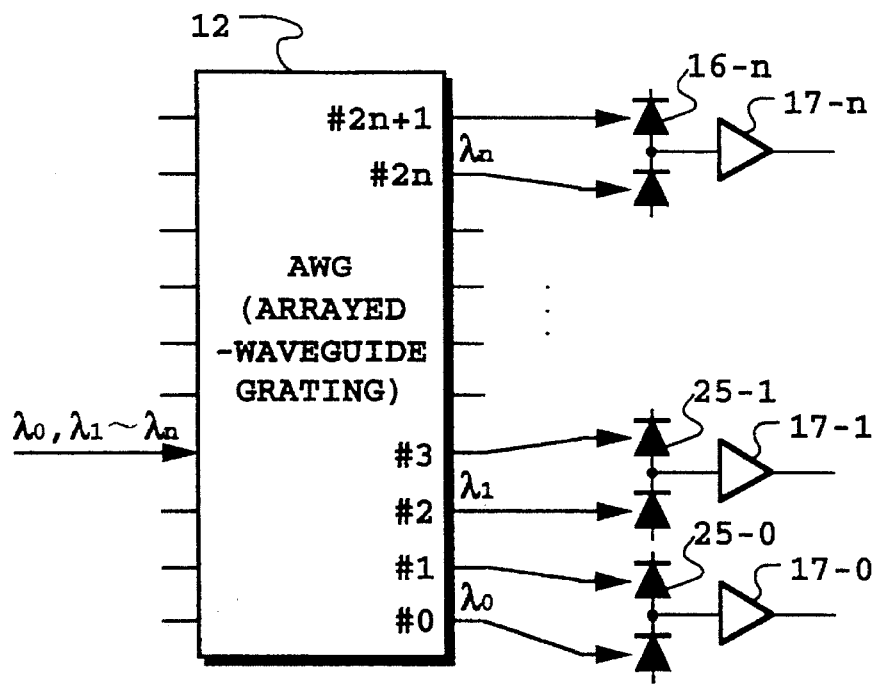
FIG. 15A is a block diagram showing a major portion of the third embodiment.

In FIG. 14A, the reference optical signal R (wavelength $\lambda_0$) and the WDM signal W (wavelength $\lambda_1$–$\lambda_n$) are multiplexed by the optical coupler 11, and then injected into a predetermined input waveguide of the AWG 12. Pairs of adjacent output waveguides #0–#2n+1 of the AWG 12 are connected to balanced photodetectors 25-0 and 25-i (i=1–n), respectively, as shown in FIG. 15A. The outputs of the balanced photodetectors 25-0 and 25-i are inputted to the amplifiers 17-0 and 17-i. The output of the amplifier 17-0 is fed to the integrator 20-0, and the output of the integrator 20-0 is connected to the temperature control circuit 21 which controls the Peltier cooler 22 that regulates the temperature of the AWG 12.

Figure 15B:
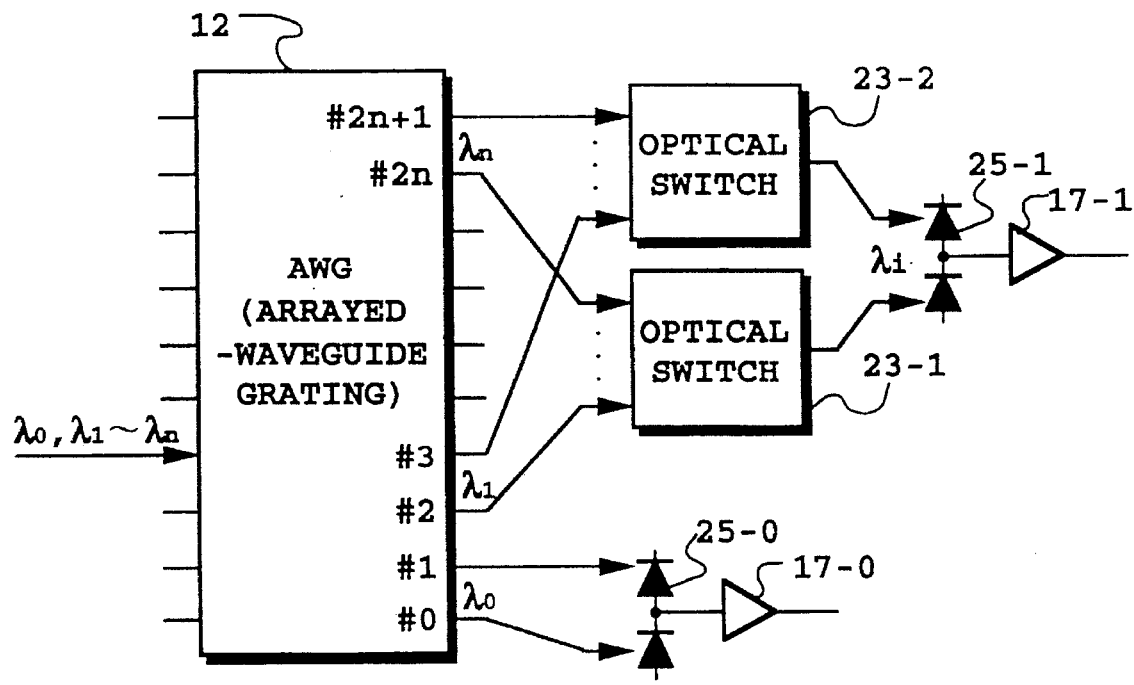
FIG. 15B is a block diagram showing a major portion of a variation of the third embodiment.

Instead of using a number of balanced photodetectors, a configuration as shown in FIG. 15B may be adopted. In this arrangement, the output waveguides #2–#2n+1 are selectively connected to a combination of the balanced photodetector 25-1 and the amplifier 17-1 through optical switches 23-1 and 23-2.

The present embodiment is characterized by carrying out the wavelength discrimination of the WDM signal while stabilizing the transmission characteristics of the AWG 12 by locking the crossover wavelength of the transmission characteristic curves of the output waveguides #0 and #1 to the reference wavelength $\lambda_0$. When the transmission characteristics of the AWG 12 are thus stabilized, the power of the reference optical signal takes a Gaussian distribution across the output waveguides #0 and #1 as shown in FIG. 16B. As shown in this figure, the Gaussian beam has overlaps with the output waveguides #0 and #1 as depicted by the shadowed portions. Accordingly, when the transmission characteristics shift to the long wavelength side or the short wavelength side, and thus the power of the beams associated with the output waveguides #0 and #1 becomes unbalanced, the difference between the center transmission wavelength and the reference wavelength $\lambda_0$ is detected as an error signal.

Figure 17A:
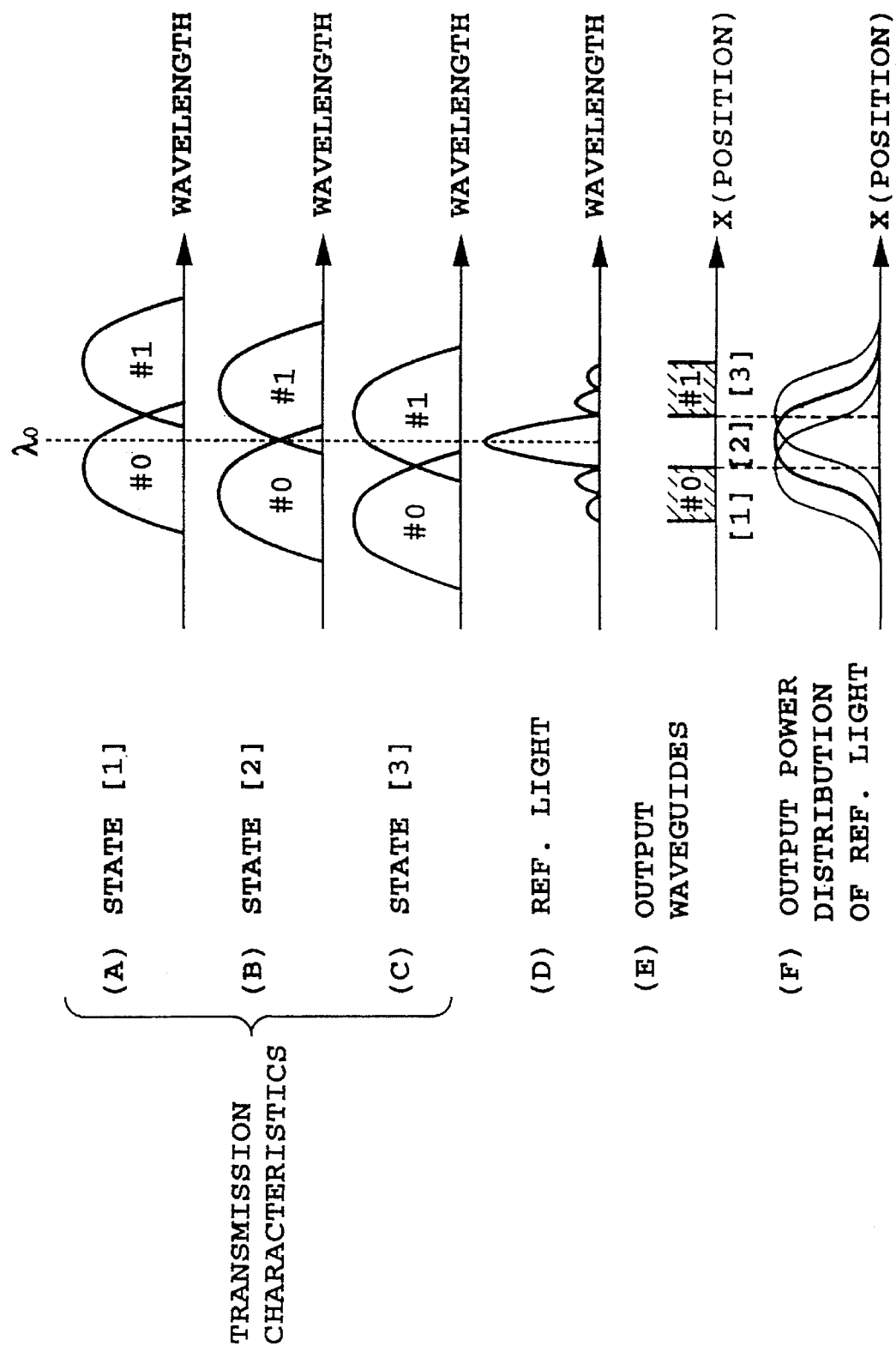
FIGS. 17A and 17B are diagrams illustrating the wavelength discrimination and stabilization of the transmission characteristics in the third embodiment.
Figure 17B:
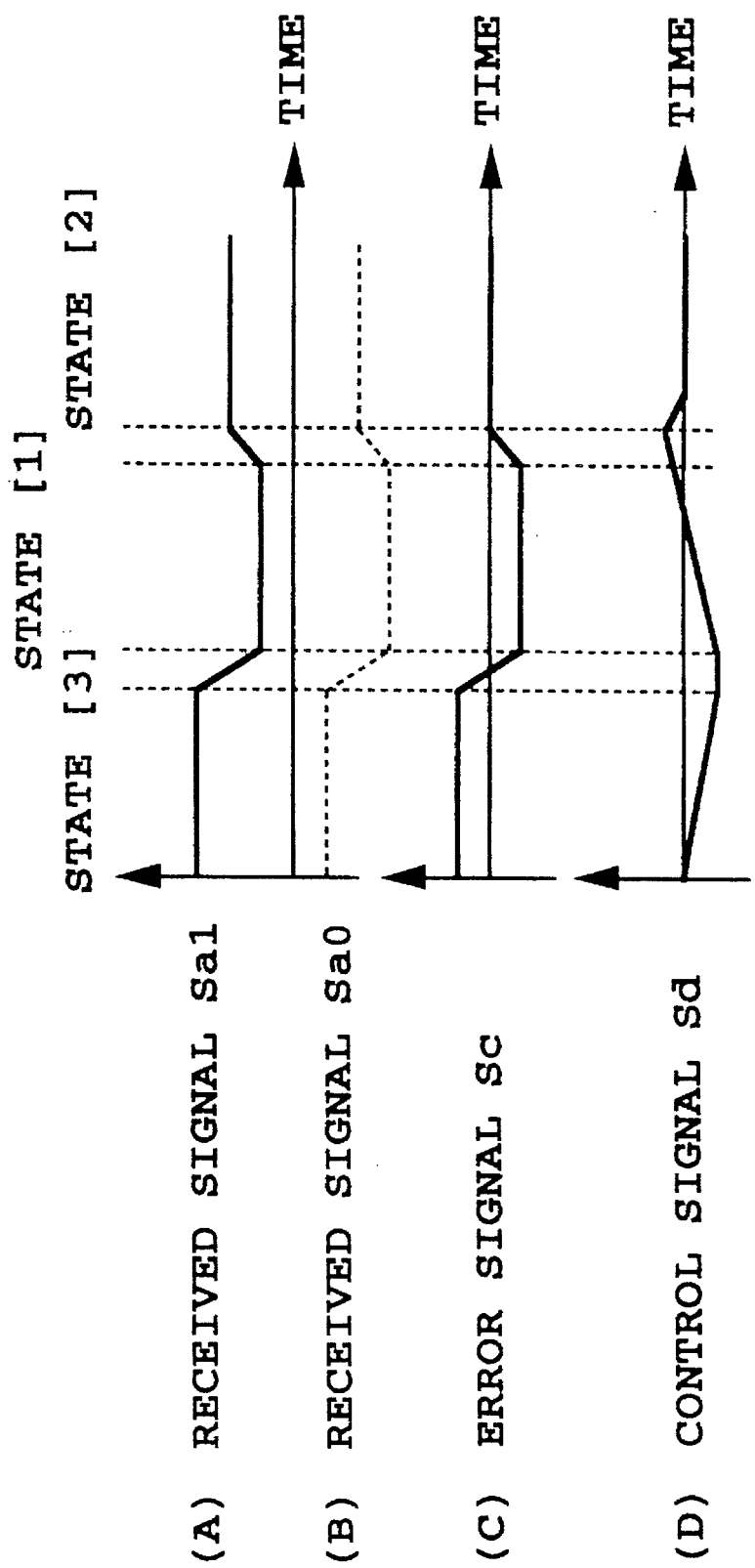

FIGS. 17A and 17B are waveform diagrams illustrating the wavelength discrimination of the reference optical signal and the stabilization of the transmission characteristic in the third embodiment.

The transmission characteristic of the output waveguides #0 and #1 takes one of the three states [1], [2] and [3] with respect to the reference wavelength $\lambda_0$. In the state [1], in which the transmission characteristic shifts to the long wavelength side with respect to the reference wavelength $\lambda_0$, the light power associated with the output waveguide #0 grows stronger, whereas in the state [3], in which the transmission characteristic shifts to the short wavelength side with respect to the reference wavelength $\lambda_0$, the light power associated with the output waveguide #1 grow stronger. In the state [2], in which the transmission characteristic coincides with the reference wavelength $\lambda_0$, the light power is equally shared between the output waveguides #0 and #1. Thus, the signals Sa0 and Sa1 received by the balanced photodetector 25-0 connected to the output waveguides #0 and #1 vary in accordance with the states [1], [2] and [3]. Since the balanced photodetector 25-0 outputs the difference between the received signals Sa0 and Sa1 as an error signal Sc, it becomes a positive voltage in the state [3], a negative voltage in the state [1], and zero in the state [2]. The error signal Sc undergoes time integration by the integrator 20-0, and is converted into the control signal Sd which controls the Peltier cooler 22. As a result, the feedback loop operates to lock the transmission characteristic of the AWG 12 to the reference wavelength $\lambda_0$.

The wavelength discrimination of the WDM signal is carried out in a similar manner. Specifically, since the transmission characteristics of the AWG 12 are stabilized to the reference wavelength $\lambda_0$, the error signals outputted from the balanced photodetectors 25-1–25-n indicate the relative wavelength differences between the respective wavelengths $\lambda_1$–$\lambda_n$ of the WDM signal and the transmission characteristics of the AWG 12.

Figure 14B:
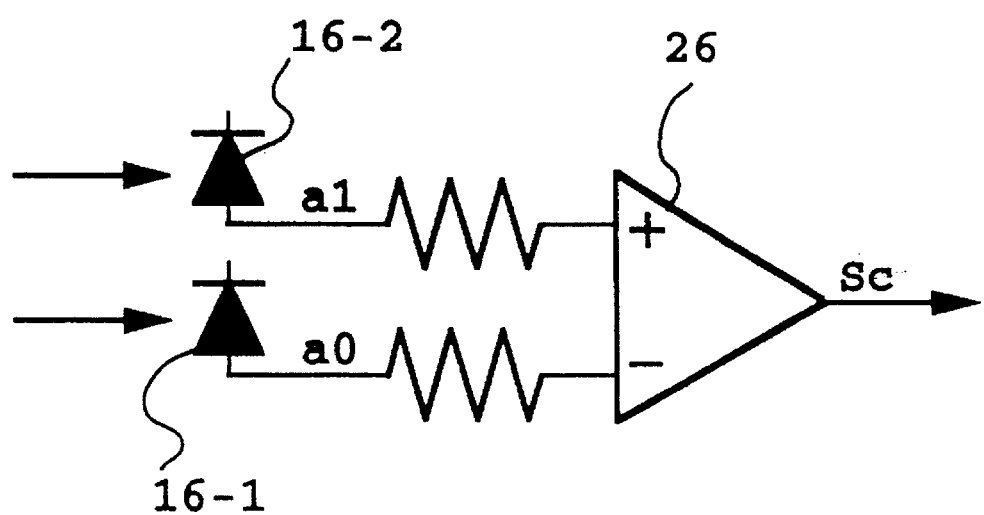
FIG. 14B is a circuit diagram showing an example which employs photodetectors and differential amplifiers instead of balanced photodetectors and amplifiers in the third embodiment.

Instead of the combination of the balanced photodetector and the amplifier employed in the present embodiment, a combination of two photodetectors 16-1 and 16-2 connected to the two output waveguides and a differential amplifier 26 as shown in FIG. 14B may be used to handle the received signals, thus achieving similar effect and advantages.

In this embodiment, the wavelength errors are detected from the light power differences between the outputs of the two adjacent output waveguides of the AWG 12. However, since the spacing between the AWG 12. However, since the spacing between the adjacent output waveguides cannot be reduced to zero as shown in FIG. 16B, the light power component in the spacing between the output waveguides is not utilized. This will reduce the light power available for the photodetectors. In other words, the transmission power at the crossover wavelength will be reduced. This problem will be solved by the following configuration.

EMBODIMENT 4

Figure 18:
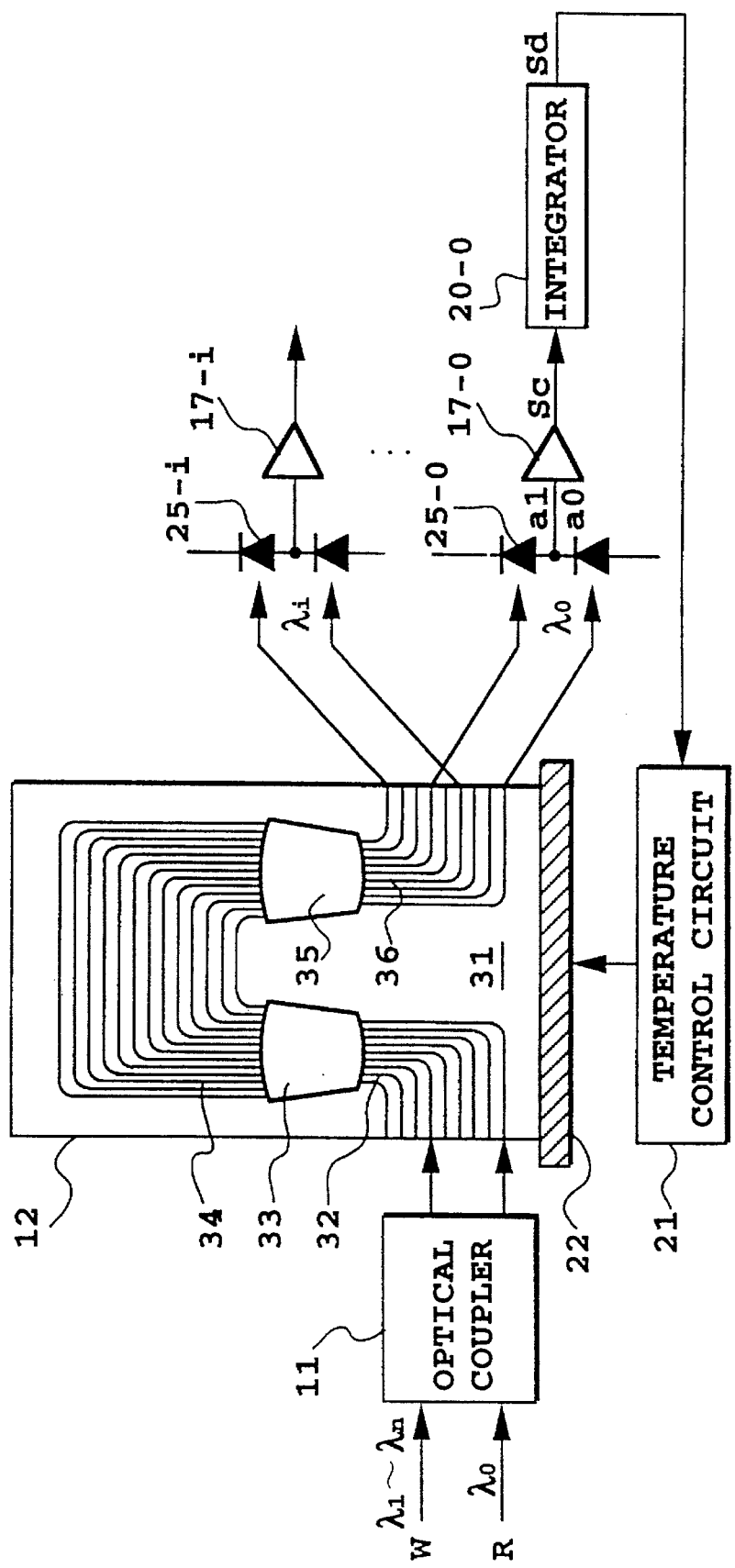
FIG. 18 is a block diagram showing a fourth embodiment of a multiwavelength simultaneous monitoring circuit in accordance with the present invention.

FIG. 18 is a block diagram showing a fourth embodiment of the multiwavelength simultaneous monitoring circuit in accordance with the present invention.

Figure 19A:
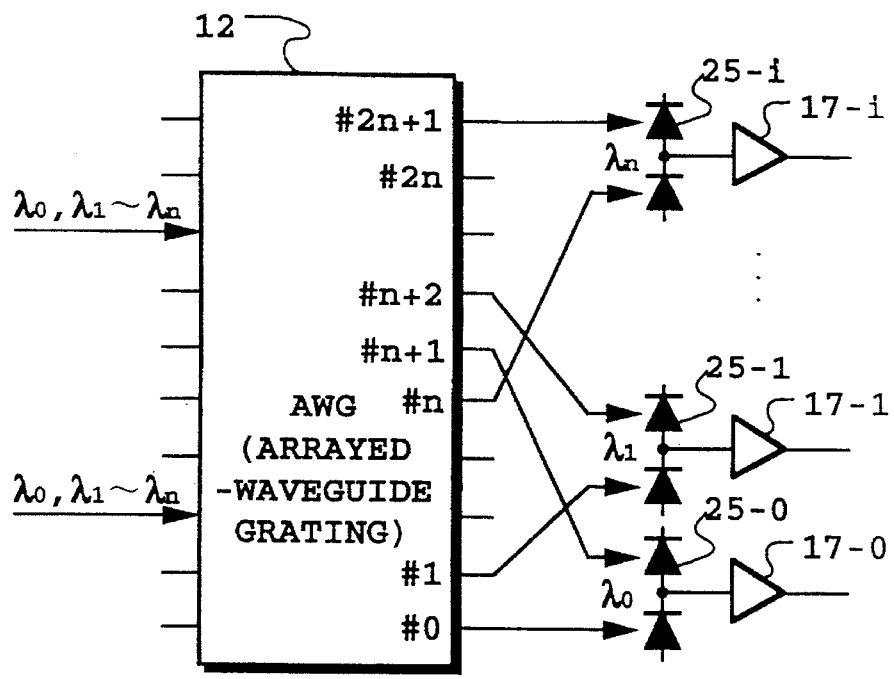
FIG. 19A is a block diagram showing a major portion of the fourth embodiment.

In FIG. 18, the reference optical signal R (wavelength $\lambda_0$) and the WDM signal W (wavelengths $\lambda_1$–$\lambda_n$) are multiplexed by a 2×2 optical coupler 27, and the multiplexed optical signal is injected into two input waveguides of the AWG 12. The multiplexed optical signal injected into a first input waveguide results in optical signals outputted from the output waveguides #0–#n, whose wavelengths are $\lambda_0$ and $\lambda_1$–$\lambda_n$. On the other hand, the multiplexed optical signal injected into a second input waveguide results in optical signals outputted from the output waveguides Balanced photodetectors 25-0 and 25-i are each connected to two output waveguides associated with the same wavelengths as shown in FIG. 19A. The outputs of the balanced photodetectors 25-0 and 25-i are connected to the amplifiers 17-0 and 17-i, respectively. The output of the amplifier 17-0 is fed to the integrator 20-0, and the output of the integrator 20-0 is connected to the temperature control circuit 21, which controls the Peltier cooler 22 that regulates the temperature of the AWG 12.

Figure 19B:
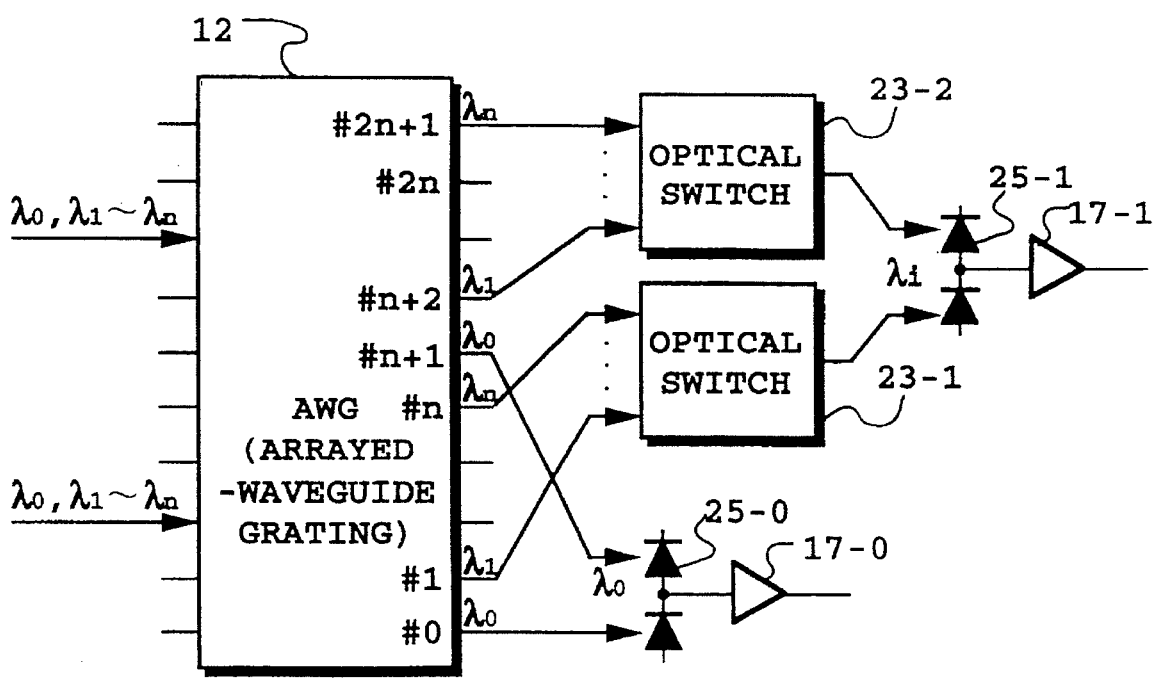
FIG. 19B is a block diagram showing a major portion of a variation of the fourth embodiment.

Instead of using a number of balanced photodetectors, a configuration as shown in FIG. 19B may be adopted. In this arrangement, the output waveguides #1–#n and #n+2–#2n+1 are selectively connected to a combination of the balanced photodetector 25-1 and the amplifier 17-1 through optical switches 23-1 and 23-2.

Figure 20:
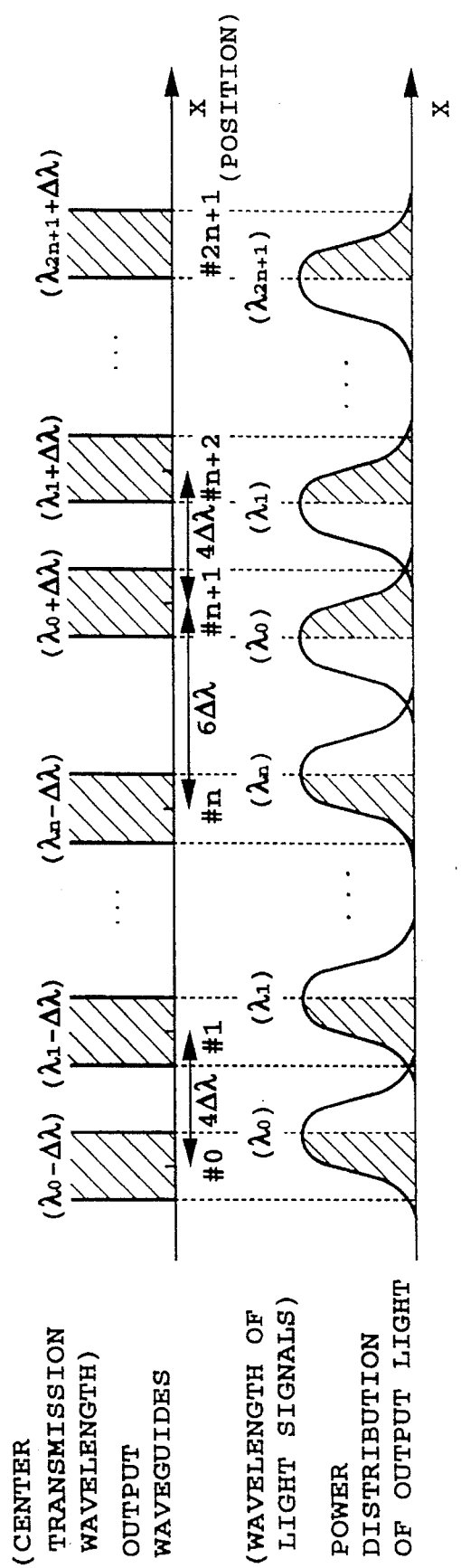
FIG. 20 is a schematic diagram illustrating the operation of the fourth embodiment.

The present embodiment is characterized in that the space between the output waveguides #0–#n and the output waveguides #n+1–#2n+1 is adjusted so that the two corresponding output waveguides are each associated with half of the light power of each wavelength as shown in FIG. 20. For example, it is designed such that the output waveguide #0 is linked with half of the reference optical signal (wavelength $\lambda_0$) on the short wavelength side, and the output waveguide #n+1 is linked with the other half of the reference optical signal (wavelength $\lambda_0$) on the long wavelength side. This means that the spacing between the output waveguides #n and #n+1 is set at 6$\Delta\lambda$ as shown in FIG. 20 so that the center transmission wavelength of the output waveguide #0 becomes $\lambda_0-\Delta\lambda$, and the center transmission wavelength of the output waveguide #n+1 is set at $\lambda_0+\Delta\lambda$ where $\Delta\lambda$ is a quarter of the spacing of the adjacent wavelengths of the WDM signal. Alternatively, the output waveguide #0 can be linked with half of the reference optical signal on the long wavelength side, and the output waveguide #n+1 can be linked with the other half of the reference optical signal on the short wavelength side. The wavelengths of the WDM signal are handled in a similar manner. Thus, the present embodiment is characterized in that the spacing between the output waveguides #n and #n+1 is set at 6$\Delta\lambda$, while all the other spacing of the output waveguides #0–#n and #n+1–#2n+1 are set at 4$\Delta\lambda$. In other words, although the normal spacing between the output waveguides is set at the wavelength interval 4$\Delta\lambda$ of the WDM signal, the spacing between the output waveguide group I (#0–#n) and the output waveguide group II (#n+1–#2n+1) is made longer than the normal spacing 4$\Delta\lambda$ by an amount of half the spacing 2$\Delta\lambda$, so that the interval between the two output waveguide groups I and II becomes 1.5 times the normal spacing (6$\Delta\lambda$).

With such transmission characteristics, if the amount $\Delta\lambda$ increases with a fluctuation of the temperature, the link with the output waveguide #0 reduces, whereas the link with the output waveguide #n+1 increases. The difference of the two is detected as in the third embodiment, and the Peltier cooler 22 is controlled in response to the difference. Thus, the feedback loop functions so as to keep the relative wavelength difference zero, and the transmission characteristics of the AWG 12 are stabilized to the reference wavelength $\lambda_0$.

The wavelength discrimination of the WDM signal is carried out in a similar manner. Specifically, since the transmission characteristics of the AWG 12 are stabilized to the reference wavelength $\lambda_0$, the error signals outputted from the balanced photodetectors 25-1–25-n indicate the relative wavelength differences between the respective wavelengths $\lambda_1-\lambda_n$ of the WDM signal and the transmission characteristics of the AWG 12.

Figure 21A:
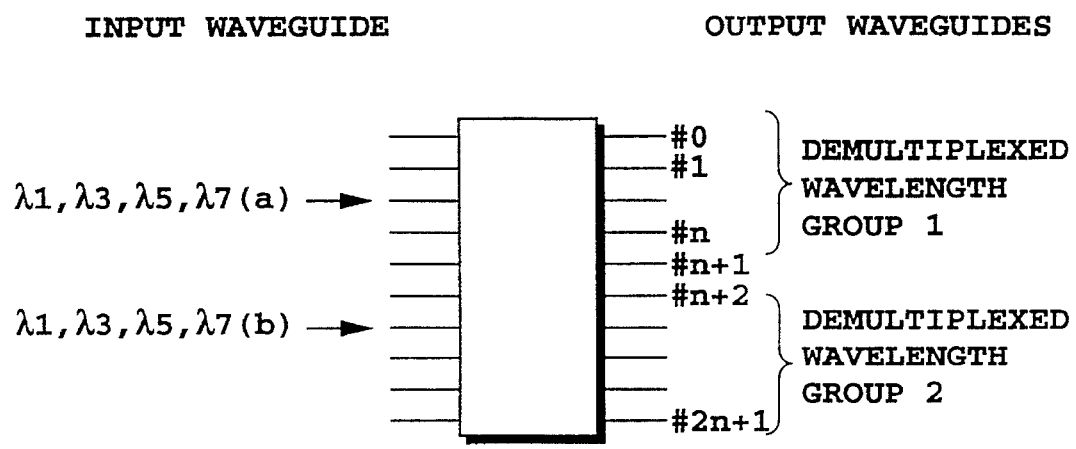
FIGS. 21A and 21B are diagrams showing input and output states of the fourth embodiment and its variation, respectively.

In the above described embodiment, a multiplexed optical signal of the reference optical signal R and the WDM signals W is injected into the input waveguides (a) and (b) as shown in FIG. 21A, so that a demultiplexed wavelength group I is produced from the output waveguides #0–#n, and a demultiplexed wavelength group II is produced from the output waveguides #n+1–#2n+1.

Figure 21B:
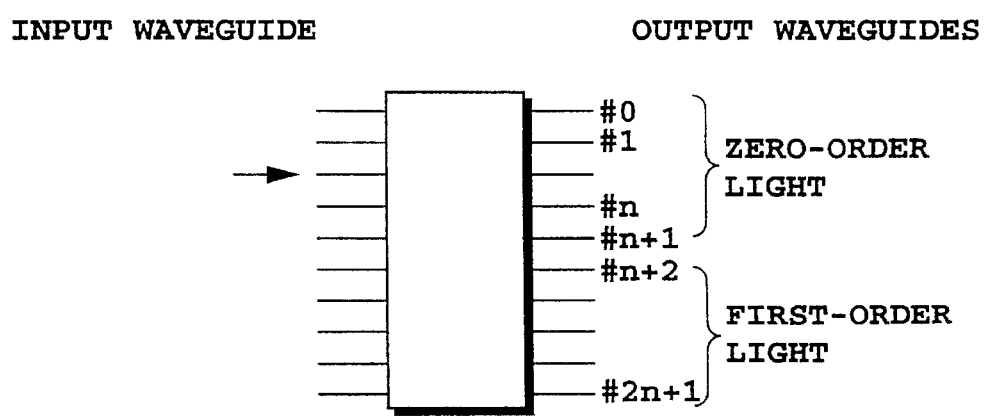

The embodiment, however, is not restricted to such a configuration. For example, as illustrated in FIG. 21B, it is possible to design such that the zero-th order (diffraction order n) light signal is produced from the output waveguides #0–#n, and the first order (diffraction order n+1) light signal is produced from the output waveguides #n+1–#2n+1. In this case, the output power of the zero-th order light signal and that of the first order light signal must be matched by a differential amplifier 26 instead of the balanced photodetector before the wavelength discrimination. Moreover, it will be possible to further increase the number of the output waveguide groups so that higher order light signals such as a second order (diffraction order n+2) light signal can be produced in addition to the zero-th and first order light signals. In this case, the spacings between the output waveguide groups of respective orders are set at 1.5 times the normal spacing (that is, 6$\Delta\lambda$) of the WDM signal.

Although the wavelength discrimination of the WDM signal is described in the above embodiments, the optical frequency discrimination can also be achieved.

EMBODIMENT 5

Figure 22:
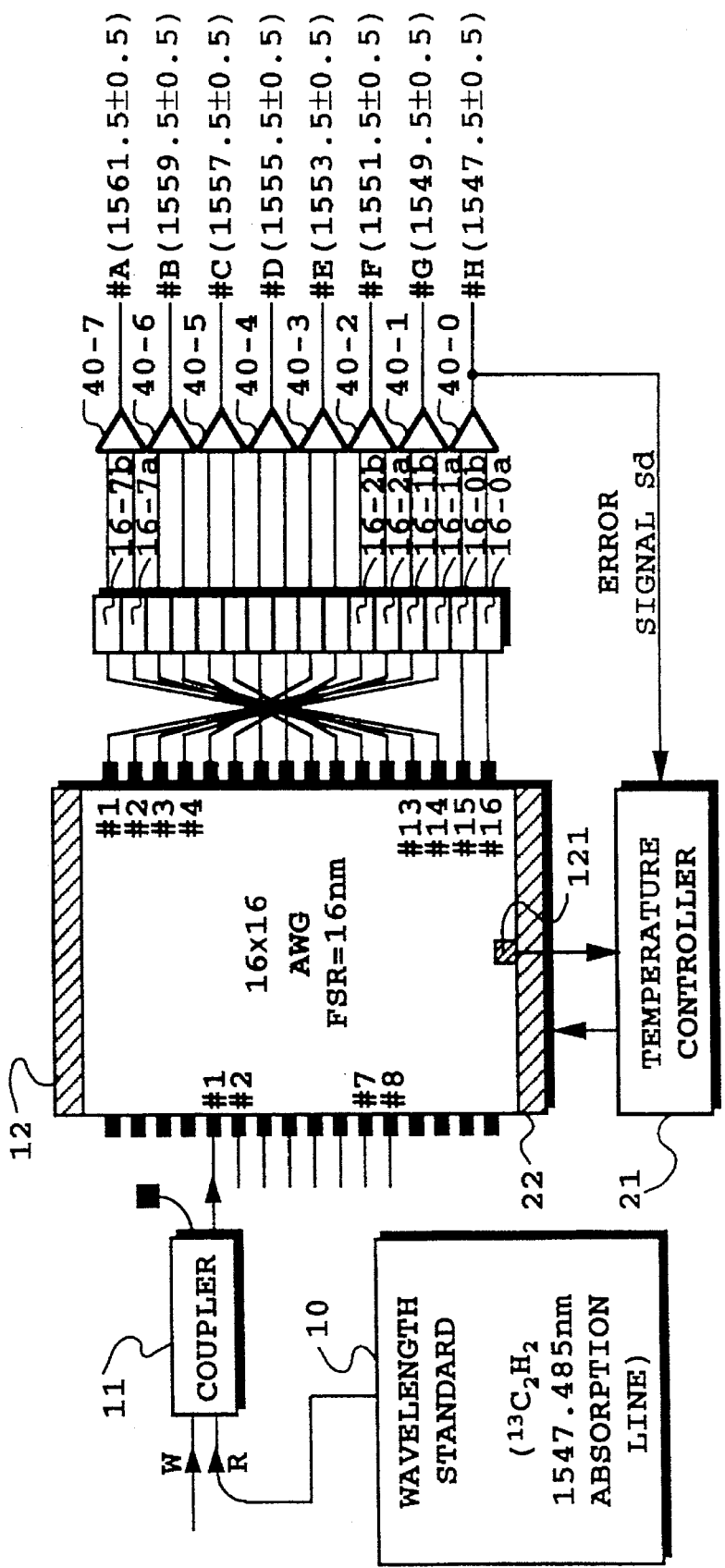
FIGS. 22 and 23 are block diagrams showing a fifth embodiment of a multiwavelength simultaneous monitoring circuit in accordance with the present invention.
Figure 23:
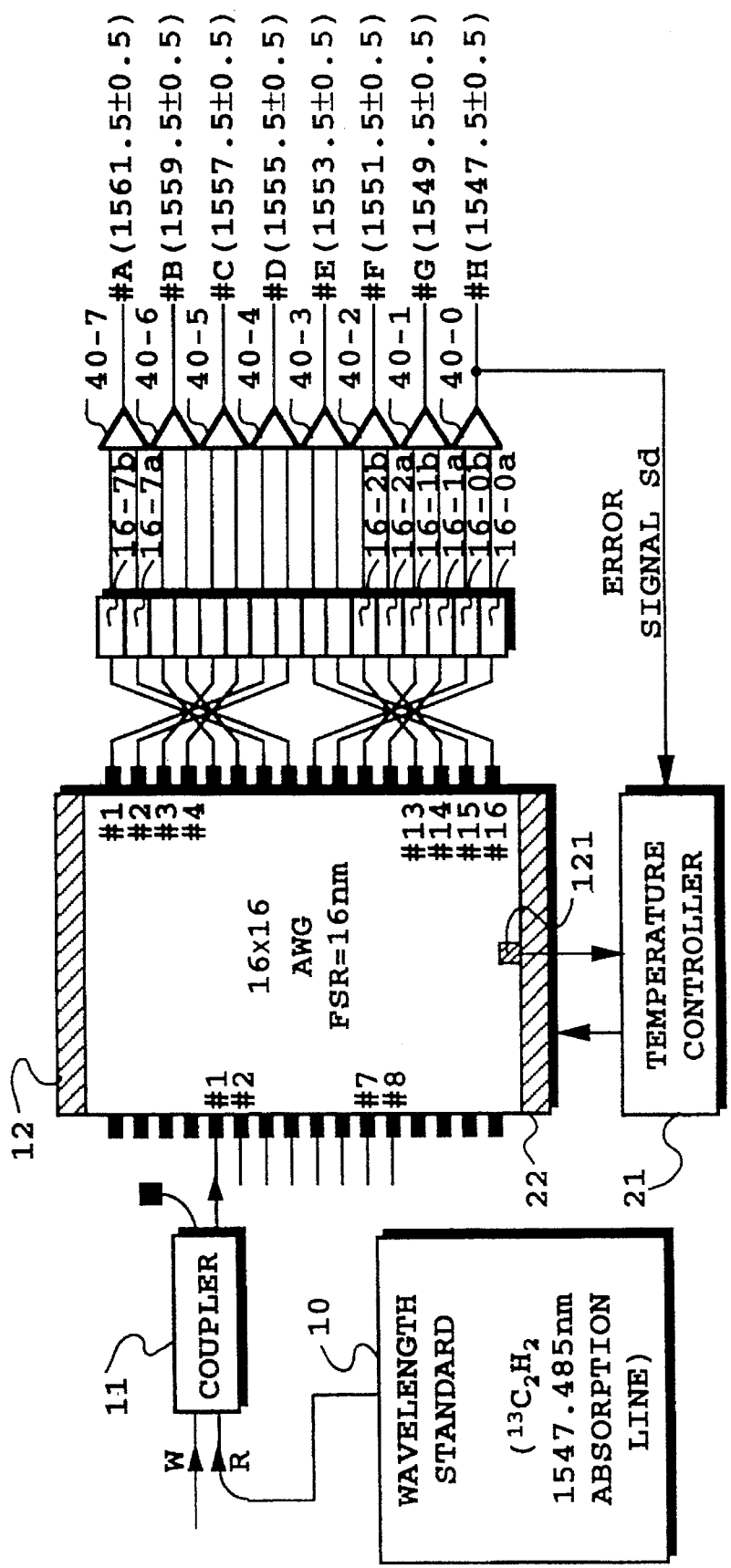

FIGS. 22 and 23 are block diagrams showing a fifth embodiment of the multiwavelength simultaneous monitoring circuit in accordance with the present invention. The fifth embodiment differs from the third embodiment shown in FIG. 14A in that the present embodiment obtains ratios between the outputs of two adjacent output ports rather than the differences between the two outputs as in the third embodiment. To achieve this in the present embodiment, the outputs of a pair of photodetectors 16-ia and 16-ib are supplied to the first and second input terminals of logarithmic amplifiers 40-i, respectively. Each of the logarithmic amplifiers 40-i converts the two input signals into log values, followed by obtaining the difference between the two, thereby outputting the ratio of the outputs of the pair of adjacent output ports as the wavelength error signal.

The AWG 12 of the present embodiment is a 16×16 AWG, and the wavelength spacing between the center transmission wavelengths of adjacent channels is 1 nm. Accordingly, FSR (Free Spectral Range) is 16 nm. The input ports are assigned to eight central input ports of the AWG 12. The center transmission wavelengths of respective channels of the AWG 12 vary in accordance with the position of an input port of the multiplexed light of the WDM signal and the reference optical signal.

Figure 24A:
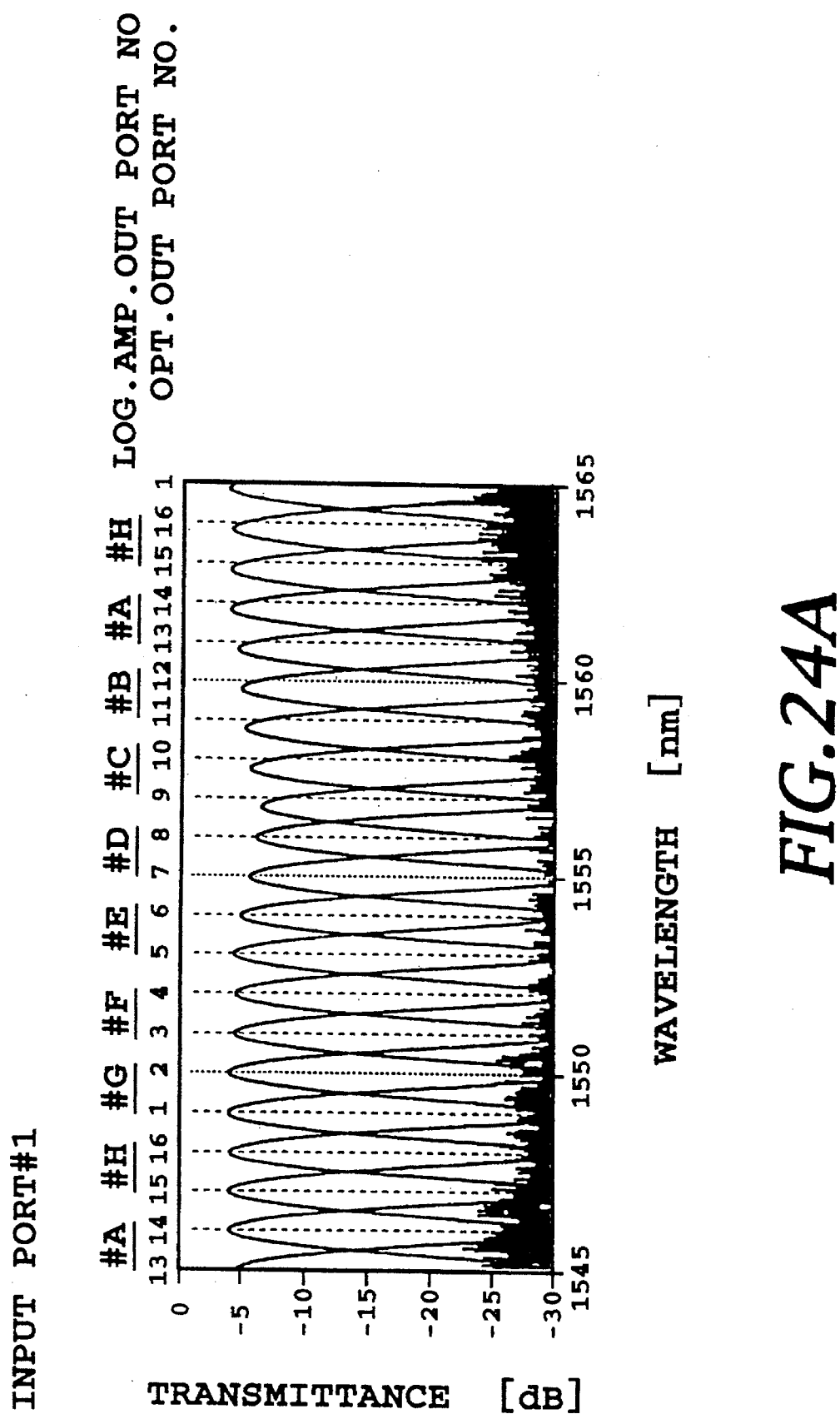

FIG. 24A is a graph illustrating the transmission characteristics of the AWG 12 when the multiplexed wave of the WDM signal and the reference optical signal is injected into the input port #1 as shown in FIG. 22. In FIG. 24A, the abscissas represent wavelengths, and the ordinates indicate transmittance. As is seen from this graph, as the output port number increments by one, the center transmission wavelength of respective channels shift by 1 nm toward longer wavelength side. For this reason, the output ports of increasing number are connected to longer wavelength side logarithmic amplifiers as shown in FIG. 22. Specifically, the output ports #1 and #2 are connected to the first and second input terminals of a shortest wavelength side logarithmic amplifier 40-1 (output #G) through a pair of photodetectors 16-1a and 16-1b. Likewise, the output ports #3 and #4 are connected to the first and second input terminals of a logarithmic amplifier 40-2 (output #F) through a pair of photodetectors 16-2a and 16-2b. Similar connections are repeated so that the output ports #13 and #14 are connected to the first and second input terminals of a longest wavelength side logarithmic amplifier 40-7 (output #A) through a pair of photodetectors 16-7a and 16-7b. In addition, the output ports #15 and #16 are for the reference optical signal, and connected to the first and second input terminals of a logarithmic amplifier 40-0 (output #H) through a pair of photodetectors 16-0a and 16-0b.

Figure 24B:
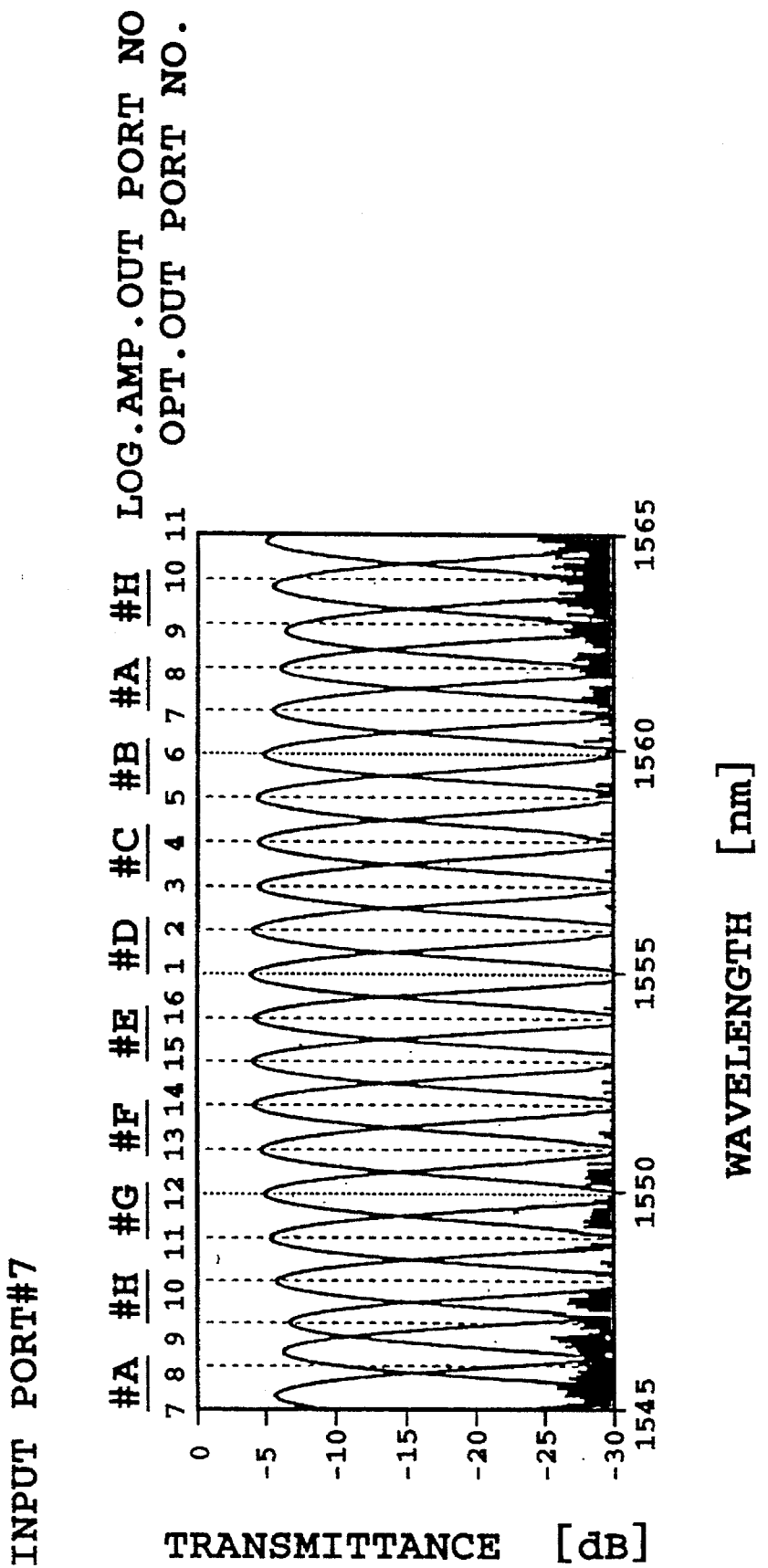

On the other hand, FIG. 24B is a graph illustrating the transmission characteristics of the AWG 12 when the multiplexed wave of the WDM signal and the reference optical signal is injected into the input port #7 as shown in FIG. 23.

In FIG. 24B, as the output port number increments by one, the center transmission wavelengths of respective channels shift by 1 nm toward longer wavelength side. In addition, when the input port is changed from #1 to #7, the center transmission wavelength of the output port #1 shifts by 6 nm toward the longer wavelength side, resulting in 1555 nm from 1549 nm. Thus, the output ports are connected as shown in FIG. 23. Specifically, the output ports #1 and #2 are connected to the first and second input terminals of a logarithmic amplifier 40-4 (output #D), and the output ports #3 and #4 are connected to the first and second input terminals of a logarithmic amplifier 40-5 (output #C). Similar connections are repeated until the output ports #15 and #16 are connected to the first and second input terminals of a logarithmic amplifier 40-3 (output #E). In addition, the output ports #9 and #10 are connected to the first and second input terminals of the logarithmic amplifier 40-0 (output #H) for the reference optical signal.

As shown in FIGS. 24A and 24B, the input and output characteristics of the AWG 12 has periodic assignment. For example, the output from the output port #15 in FIG. 24A has center transmission wavelengths at 1547 nm and 1563 nm, which are separated apart by an amount of FSR (in this case, 16 nm). Similar effect is obtained for crossover wavelength which is defined as the intersection of two adjacent center transmission wavelength characteristic curves.

FIGS. 25A–25H illustrate this. FIG. 25(A)–(H) show the zero-cross points of the outputs #A–#H of the logarithmic amplifiers 40-7–40-0. As is clearly seen from these figures, the zero-cross points shift by 2 nm interval. This is because each logarithmic amplifier is connected to every two output ports.

With such a configuration, since the wavelength error signal is obtained as a ratio of two output optical signals, high accuracy, stable wavelength discrimination can be achieved in spite of fluctuations in power of input optical signals.

Figure 26A:
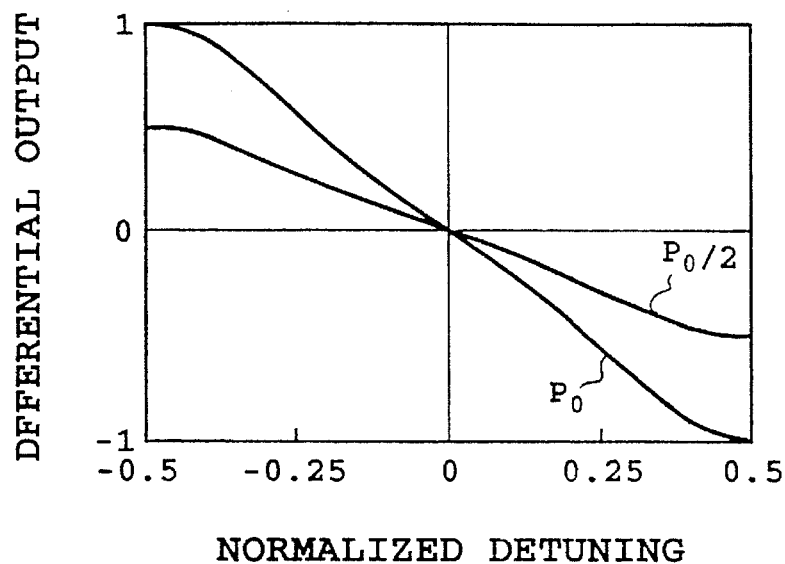
FIG. 26A is a graph illustrating the dependence of the difference between two output optical signals on the input optical power.
Figure 26B:
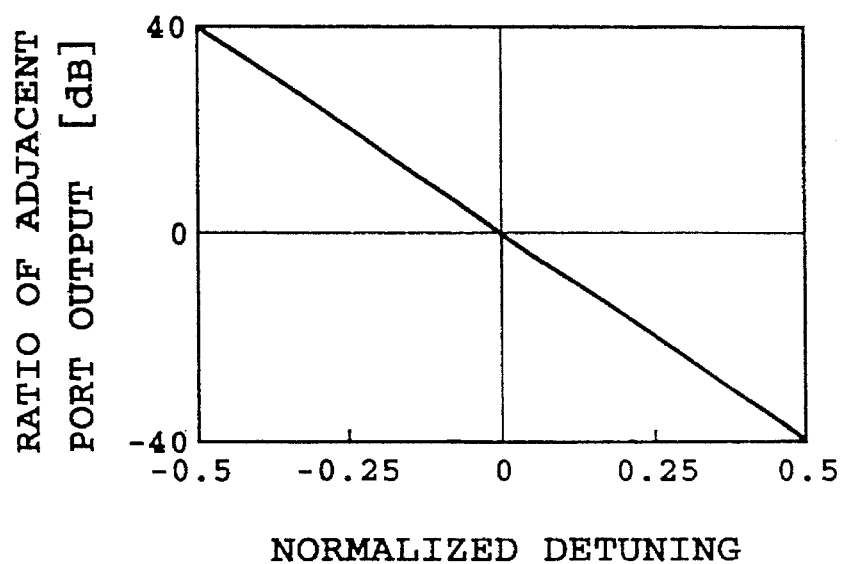
FIG. 26B is a graph illustrating the independence of the difference between two output optical signals of the input optical power.

FIGS. 26A and 26B are graphs comparatively illustrating the cases when the difference between the outputs from the two output ports are taken (FIG. 26A), and when the ratio between the two outputs are taken (FIG. 26B). The abscissas of the graphs represent normalized detuning from the crossover wavelengths, and the ordinates indicate the differences and ratios, which are normalized by input power. As is shown in these figures, although the difference output varies depending on the input light power $P_0$ and $P_0/2$, the ratio output is independent of the input power, resulting in a constant characteristic.

The range of measurement of the WDM signal is defined as a range in which the output of each logarithmic amplifier is established to produce the ratio of the two output optical signals. As shown in FIG. 26B, the output of each logarithmic amplifier becomes zero at the zero crossover wavelength, and increases as the wavelength separates apart from this point, and the range of measurement is limited to about 0.5 nm around the crossover wavelengths. In other words, the range of measurement corresponds to the linear portions about the crossover wavelengths such as 1547–1548 nm in FIG. 24(H).

The wavelength of the reference optical signal can be set at a desired value in the output range of the logarithmic amplifier 40-0 (output #H). More specifically, adding to the wavelength error signal the offset corresponding to the difference between the set value of the crossover wavelength and the reference wavelength, which offset is outputted from the offset circuit 216 shown in FIG. 6, allows to use a reference wavelength different from the set crossover wavelength.

Actually, the crossover wavelength of the AWG 12 is set at 1547.5 nm, whereas the reference wavelength outputted from the laser diode optical source 10 is 1547.485. The difference of 0.015 nm (1.8 GHz in terms of frequency) between the two can be adjusted on the output voltage offset of the logarithmic amplifier, so that stable control of the center transmission wavelength can be achieved.

EMBODIMENT 6

Figure 27:
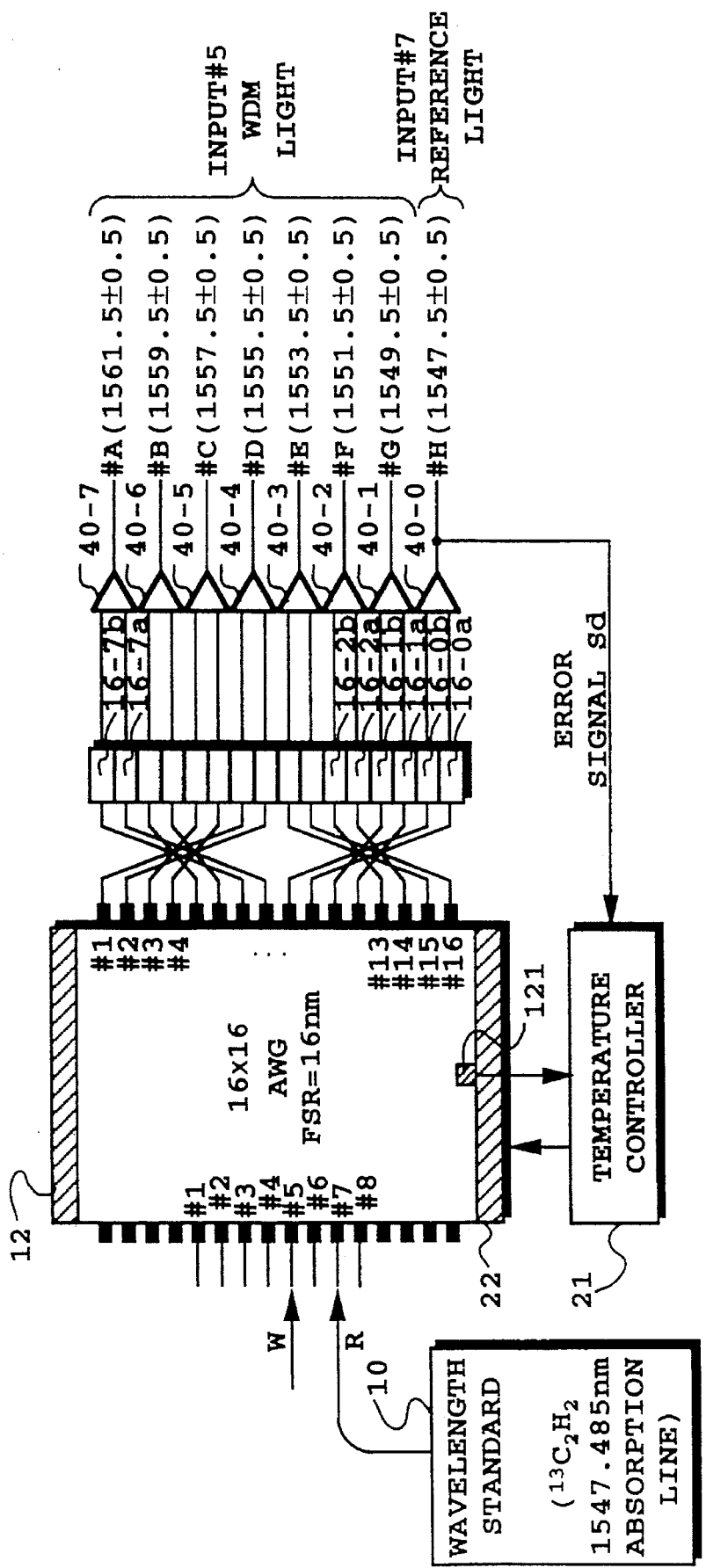
FIG. 27 is a block diagram showing a sixth embodiment of a multiwavelength simultaneous monitoring circuit in accordance with the present invention.

FIG. 27 is a block diagram showing a sixth embodiment of a multiwavelength simultaneous monitoring circuit in accordance with the present invention. The present embodiment differs from the fifth embodiment shown in FIGS. 22 and 23 in that the WDM signal W and the reference optical signal R are injected into different input ports in the present embodiment. That is, the WDM signal W is inputted to the input port #5, whereas the reference optical signal R is inputted to the input port #7.

The center transmission wavelengths of the WDM signal inputted to the input port #5 shift by 2 nm toward the shorter wavelength side than those of FIG. 23 where it is inputted to the input port #7. Accordingly, the respective crossover wavelengths also shift by 2 nm. For example, the output #A of the logarithmic amplifier 40-7 shifts to 1559.5 nm when the input port is #5, from the crossover wavelength of 1561.5 when the input port is #7.

With this arrangement, the wavelength monitoring is possible even if one of the wavelength of the WDM signal W is the same as that of the reference optical signal R. This is because the two optical signals are outputted from different output ports although their wavelengths are the same.

Figure 28:
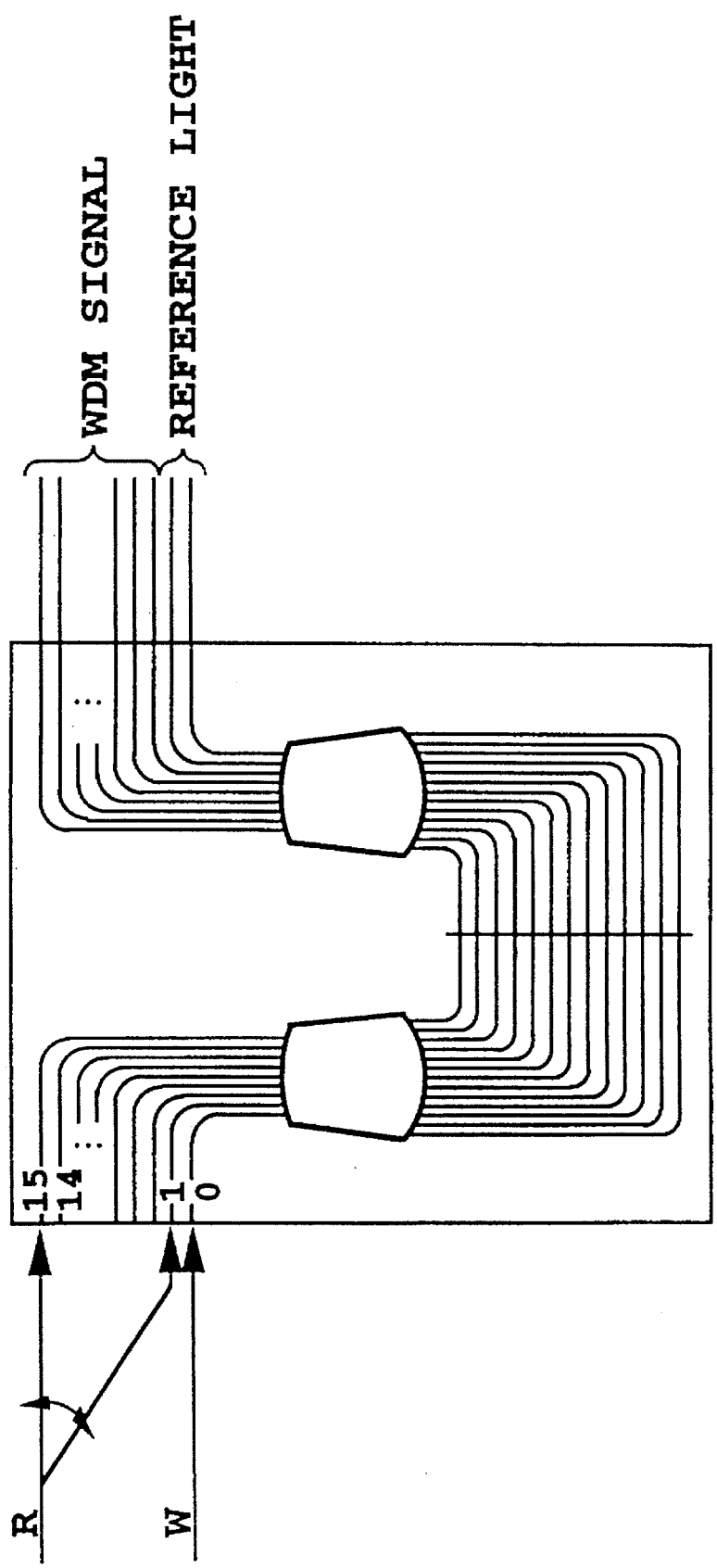
FIG. 28 is a diagram illustrating an output optical signal state when the WDM signal is injected into the input port #0 and the reference optical signal is injected into another input port.
Figure 29:
FIG. 29 is a map illustrating wavelength allocation of the WDM signal and the reference optical signal, when they are injected into the same input port.

FIGS. 28, 29, 30A and 30B are diagrams illustrating this. In the case where multiplexed light of the WDM signal W and the reference optical signal R is inputted to the input port #0 of FIG. 28, the wavelength allocation is as shown in FIG. 29 under the restriction that the number of output ports is twice the number of input wavelength, that is, one (for the reference optical signal) + the number of multiplexed wavelengths of the WDM signal. Thus, allowed wavelengths Ref(i) of the reference optical signal are limited to the wavelengths which are out of the wavelength range of the WDM signal, and integer multiples of the FSR.

Figures 30A, 30B:
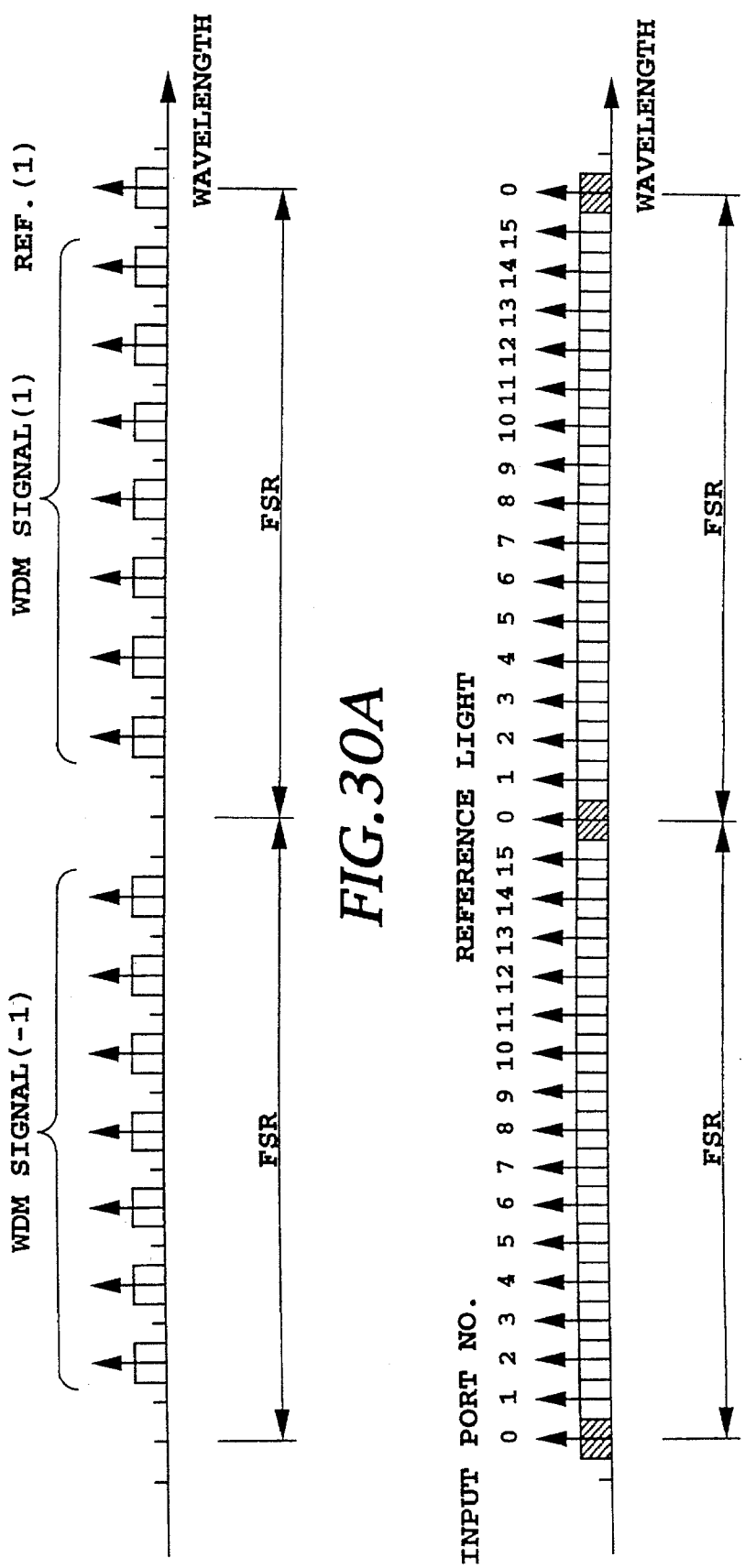

On the other hand, as shown in FIG. 28, when the WDM signal W and the reference optical signal R are injected into different input ports, the reference optical signal in the ranges depicted by open squares in FIG. 30B are allowed against the WDM signal shown in FIG. 30A. The shaded squares in FIG. 30B indicate the reference wavelengths allowed when the WDM signal and the reference optical signals are inputted to the same input port. Thus, changing the input port of the reference optical signal R enables a desired wavelength to be used as the reference wavelength.

Figure 31:
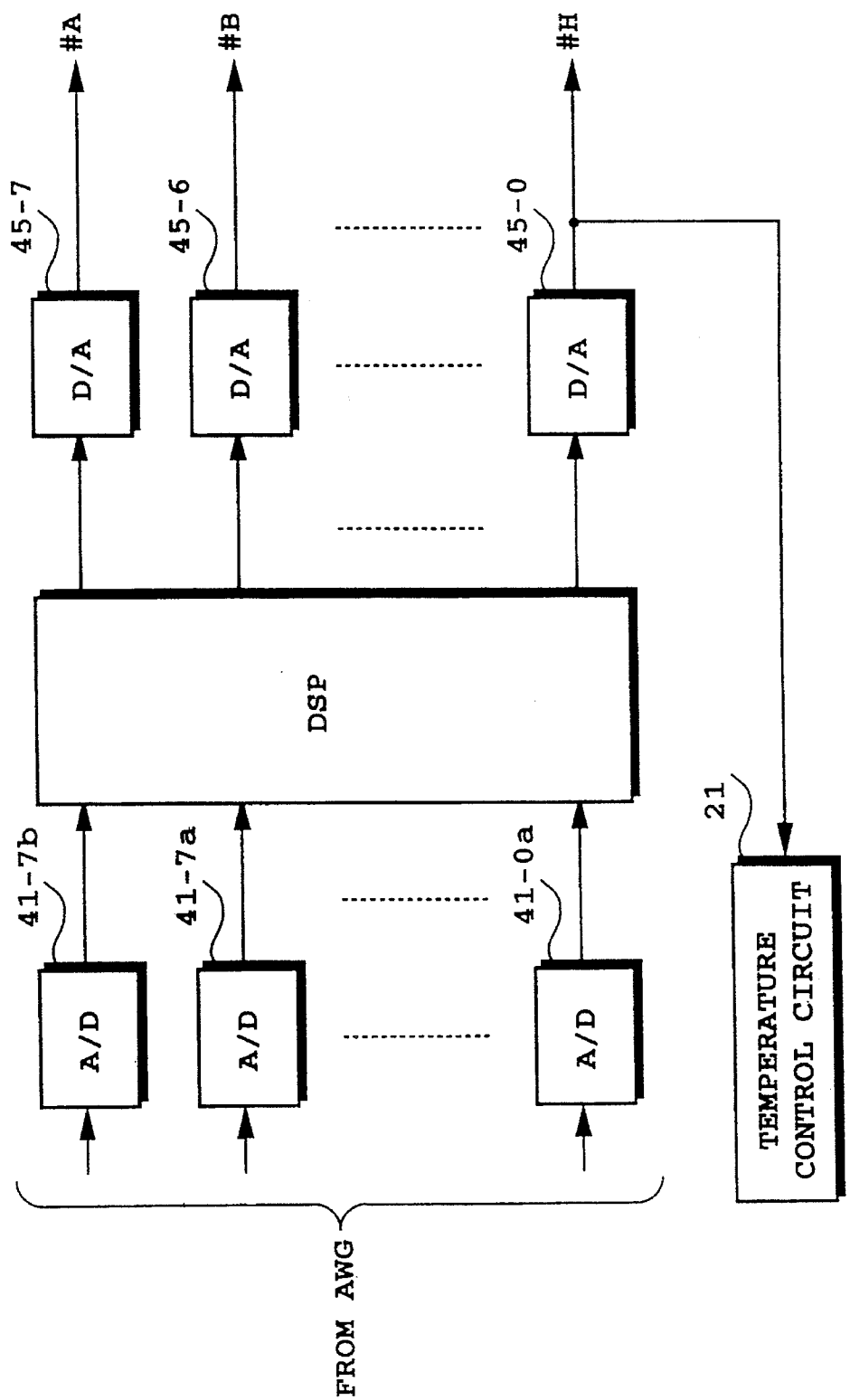
FIG. 31 is a block diagram showing an arrangement when A/D converters, a DSP (Digital Signal Processor), and D/A converters are connected to the outputs of photodetector instead of logarithmic amplifiers.

Although the logarithmic amplifiers are employed for obtaining the ratios between the outputs of the AWG 12 in the fifth and sixth embodiments, the logarithmic amplifiers are not essential. For example, as shown in FIG. 31, A/D converters 41-0a–41-07b, a DSP (Digital Signal Processor) 43, and D/A converters 45-0–45-7 can be used instead of the logarithmic amplifiers, resulting in similar effect and advantages. In this case, the input terminals of the A/D converters 41-0a–41-7b are connected to the output terminals of photodetectors 16-0a–16-7b, respectively.

Furthermore, the D/A converters 45-0–45-7 can be obviated, in which case, the wavelength error signals are outputted in the form of digital signals.

EMBODIMENT 7

Figure 32:
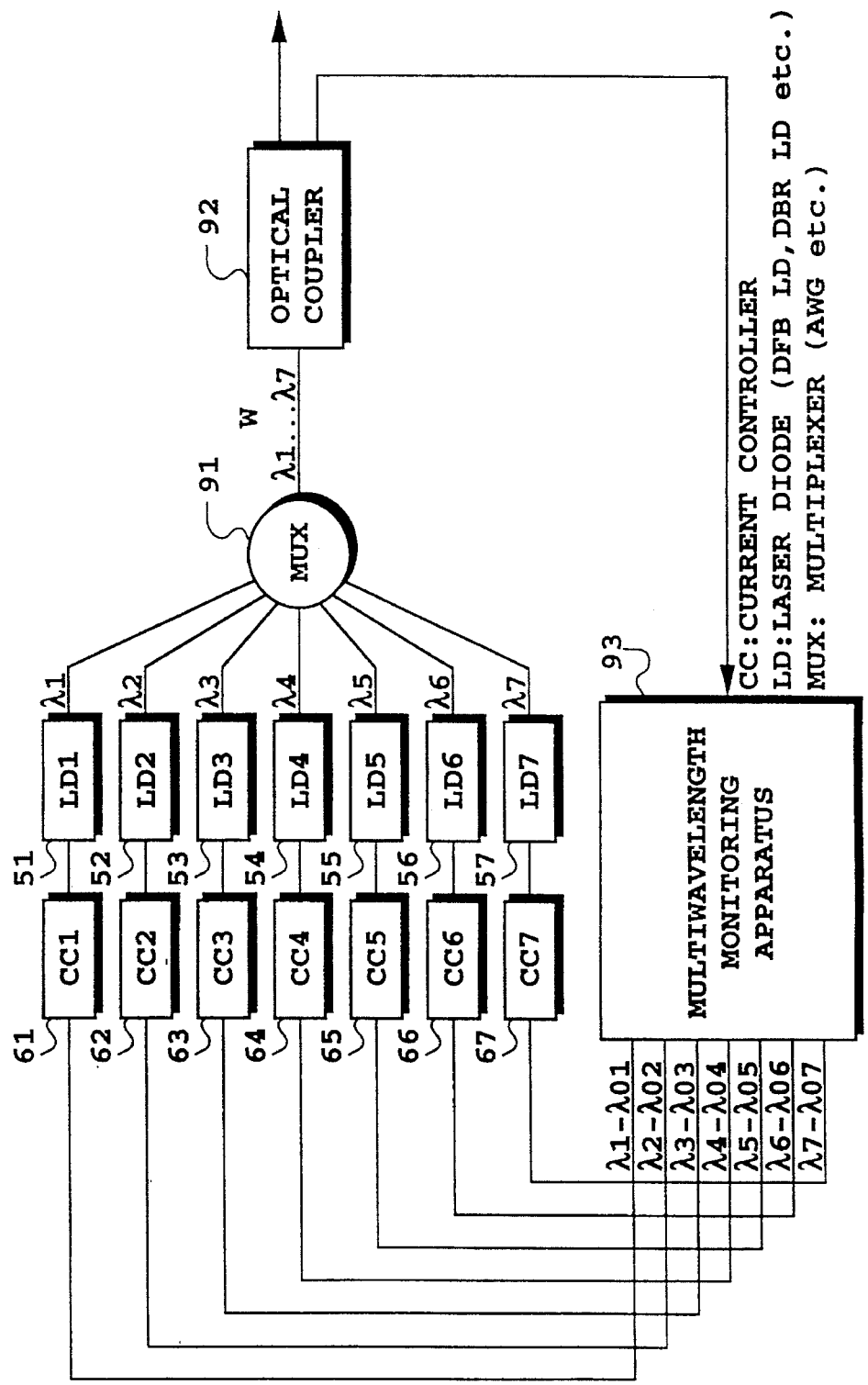
FIG. 32 is a block diagram showing an embodiment, in which the multiwavelength simultaneous monitoring circuit in accordance with the present invention is applied to a laser diode device for a multiwavelength transmitter.

FIG. 32 shows an embodiment, in which the multiwavelength simultaneous monitoring circuit in accordance with the present invention is applied to the wavelength control for laser diodes of a transmitter.

In this figure, optical signals with wavelengths of $\lambda_1$–$\lambda_7$ outputted from laser diodes 51–57 are multiplexed by a multiplexer 91 to form a WDM signal which is supplied to an optical coupler 92. The optical coupler separates a part of the WDM signal, and supplies its fraction to a multiwavelength simultaneous monitoring circuit 93, and outputs the remainder thereof. The monitoring circuit 93 outputs differences $\lambda_1$–$\lambda_{01}$, ..., $\lambda_7$–$\lambda_{07}$ between the predetermined wavelengths $\lambda_{01}$, ... $\lambda_{07}$ and respective wavelength optical signals of the WDM signal. The differences are negatively fed back to injection current control circuits 61–67 of the laser diodes 51–57, so that the differences become zero. As a result, the oscillation wavelength of the laser diodes are stabilized at the set values $\lambda_{01}$, ..., $\lambda_{07}$.

The injection current control circuits may be replaced by temperature control circuits to achieve the feedback control.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A multiwavelength simultaneous monitoring circuit which controls center transmission wavelengths of a plurality of channels on the basis of a reference optical signal of a predetermined wavelength, and simultaneously monitors wavelength errors of individual optical signals Sk (k=1–N, where N is a positive integer) of a WDM (wavelength division multiplexed) signal outputted from the channels, said monitoring circuit comprising:

an AWG (arrayed-waveguide grating) including at least one first channel outputting at least a part of said reference optical signal when said reference optical signal and said WDM signal are inputted, and at least one second channel outputting at least a part of said optical signal Sk for each of said optical signals Sk;

a first photodetecting means for detecting said reference optical signal outputted from said first channel;

a second photodetecting means for detecting said optical signal Sk outputted from said second channel;

control means for stabilizing said center transmission wavelength of said first channel on the basis of an output from said first photodetecting means; and wavelength error detecting means for producing an error signal indicative of a wavelength error of said optical signal Sk on the basis of an output of said second photodetecting means.

2. The multiwavelength simultaneous monitoring circuit as claimed in claim 1, wherein said control means comprises:

modulating means for providing modulation so that said first channel outputs a modulated reference optical signal;

a first coherent detector for coherently detecting the output of said first photodetecting means; and a first detector for detecting a wavelength error of a wavelength of said reference optical signal on the basis of an output of said first coherent detector, wherein the center transmission wavelength of said first channel is stabilized on the basis of an output of said first detector.

3. The multiwavelength simultaneous monitoring circuit as claimed in claim 1, wherein said AWG comprises two first channels associated with said reference optical signal, and two second channels associated with each optical signal Sk of said optical signals Sk, and wherein said monitoring circuit further comprises:

a first comparing means for comparing powers of two optical outputs produced from said first channels; and a second comparing means for comparing powers of two optical outputs produced from said second channels;

and wherein said control means stabilizes the center transmission wavelengths of said first channels on the basis of an output of said first comparing means, and said wavelength error detecting means detects wavelength error of said optical signal Sk on the basis of an output of said second comparing means.

4. The multiwavelength simultaneous monitoring circuit as claimed in claim 1, wherein said control means comprises an offset circuit generating an offset signal indicative of a difference between the wavelength of said reference optical signal and the center transmission wavelength of said first channel associated with said reference optical signal, and wherein said control means adds said offset signal to a difference between a wavelength of said reference optical signal and an actual center transmission wavelength of said first channel to obtain a summing result, and controls so that said center transmission wavelength of said first channel coincides with a predetermined center transmission wavelength on the basis of said summing result.

5. The multiwavelength simultaneous monitoring circuit as claimed in claim 2, wherein said control means comprises an offset circuit generating an offset signal indicative of a difference between the wavelength of said reference optical signal and the center transmission wavelength of said first channel associated with said reference optical signal, and wherein said control means adds said offset signal to a difference between a wavelength of said reference optical signal and an actual center transmission wavelength of said first channel to obtain a summing result, and controls so that said center transmission wavelength of said first channel coincides with a predetermined center transmission wavelength on the basis of said summing result.

6. The multiwavelength simultaneous monitoring circuit as claimed in claim 3, wherein said control means comprises an offset circuit generating an offset signal indicative of a difference between the wavelength of said reference optical signal and the center transmission wavelength of said first channel associated with said reference optical signal, and wherein said control means adds said offset signal to a difference between a wavelength of said reference optical signal and an actual center transmission wavelength of said first channel to obtain a summing result, and controls so that said center transmission wavelength of said first channel coincides with a predetermined center transmission wavelength on the basis of said summing result.

7. The multiwavelength simultaneous monitoring circuit as claimed in claim 2, wherein said modulating means simultaneously modulates respective channels of said AWG.

8. The multiwavelength simultaneous monitoring circuit as claimed in claim 7, wherein said wavelength error detecting means comprises:
   a second coherent detector for coherently detecting an output signal of said second photodetecting means; and
   a second detector for detecting a wavelength error of said optical signal Sk of said WDM signal on the basis of an output of said second coherent detector.

9. The multiwavelength simultaneous monitoring circuit as claimed in claim 8, further comprising input means for injecting said WDM signal and said reference optical signal simultaneously into one of said channels of said AWG.

10. The multiwavelength simultaneous monitoring circuit as claimed in claim 8, further comprising input means for injecting said WDM signal and said reference optical signal separately into different channels of said AWG.

11. The multiwavelength simultaneous monitoring circuit as claimed in claim 2, wherein said modulating means modulates said WDM signal and said reference optical signal, and injects a modulated optical signal into at least one of the channels of said AWG.

12. The multiwavelength simultaneous monitoring circuit as claimed in claim 11, wherein said wavelength error detecting means comprises:
   a second coherent detector for coherently detecting an output signal of said second photodetecting means; and
   a second detector for detecting a wavelength error of said optical signal Sk of said WDM signal on the basis of an output of said second coherent detector.

13. The multiwavelength simultaneous monitoring circuit as claimed in claim 12, further comprising input means for injecting said WDM signal and said reference optical signal simultaneously into one of said channels of said AWG.

14. The multiwavelength simultaneous monitoring circuit as claimed in claim 12, further comprising input means for injecting said WDM signal and said reference optical signal separately into different channels of said AWG.

15. The multiwavelength simultaneous monitoring circuit as claimed in claim 3, further comprising input means for injecting said WDM signal and said reference optical signal simultaneously into one of said channels of said AWG.

16. The multiwavelength simultaneous monitoring circuit as claimed in claim 3, further comprising input means for injecting said WDM signal and said reference optical signal separately into different channels of said AWG.

17. The multiwavelength simultaneous monitoring circuit as claimed in claim 3, further comprising input means for splitting a multiplexed signal of said WDM signal and said reference optical signal, and for injecting the split multiplexed signal into separate channels of said AWG.

18. The multiwavelength simultaneous monitoring circuit as claimed in claim 17, wherein said two first channels are adjacent to each other, and said two second channels are adjacent to each other.

19. The multiwavelength simultaneous monitoring circuit as claimed in claim 17, wherein said two first channels are separated apart by an amount corresponding to an FSR (Free Spectral Range), and said two second channels are separated apart by the amount corresponding to the FSR.

20. The multiwavelength simultaneous monitoring circuit as claimed in claim 18, wherein said first comparing means comprises a logarithmic amplifier, and said second comparing means comprises a logarithmic amplifier.

21. The multiwavelength simultaneous monitoring circuit as claimed in claim 18, wherein said first comparing means comprises an A/D converter and a digital signal processor, and said second comparing means comprises an A/D converter and a digital signal processor.

22. The multiwavelength simultaneous monitoring circuit as claimed in claim 18, wherein said first comparing means comprises a differential photodetector, and said second comparing means comprises a differential photodetector.

23. The multiwavelength simultaneous monitoring circuit as claimed in claim 19, wherein said first comparing means comprises a logarithmic amplifier, and said second comparing means comprises a logarithmic amplifier.

24. The multiwavelength simultaneous monitoring circuit as claimed in claim 19, wherein said first comparing means comprises an A/D converter and a digital signal processor, and said second comparing means comprises an A/D converter and a digital signal processor.

25. The multiwavelength simultaneous monitoring circuit as claimed in claim 19, wherein said first comparing means comprises a differential photodetector, and said second comparing means comprises a differential photodetector.

26. The multiwavelength simultaneous monitoring circuit as claimed in claim 16, wherein said two first channels are adjacent to each other, and said two second channels are adjacent to each other.

27. The multiwavelength simultaneous monitoring circuit as claimed in claim 16, wherein said two first channels are separated apart by an amount corresponding to an FSR (Free Spectral Range), and said two second channels are separated apart by the amount corresponding to the FSR.

28. The multiwavelength simultaneous monitoring circuit as claimed in claim 26, wherein said first comparing means comprises a logarithmic amplifier, and said second comparing means comprises a logarithmic amplifier.

29. The multiwavelength simultaneous monitoring circuit as claimed in claim 26, wherein said first comparing means comprises an A/D converter and a digital signal processor, and said second comparing means comprises an A/D converter and a digital signal processor.

30. The multiwavelength simultaneous monitoring circuit as claimed in claim 26, wherein said first comparing means comprises a differential photodetector, and said second comparing means comprises a differential photodetector.

31. The multiwavelength simultaneous monitoring circuit as claimed in claim 27, wherein said first comparing means comprises a logarithmic amplifier, and said second comparing means comprises a logarithmic amplifier.

32. The multiwavelength simultaneous monitoring circuit as claimed in claim 27, wherein said first comparing means comprises an A/D converter and a digital signal processor, and said second comparing means comprises an A/D converter and a digital signal processor.

33. The multiwavelength simultaneous monitoring circuit as claimed in claim 27, wherein said first comparing means comprises a differential photodetector, and said second comparing means comprises a differential photodetector.

34. The multiwavelength simultaneous monitoring circuit as claimed in claim 17, wherein said two first channels are adjacent to each other, and said two second channels are adjacent to each other.

35. The multiwavelength simultaneous monitoring circuit as claimed in claim 17, wherein said two first channels are separated apart by an amount corresponding to an FSR (Free Spectral Range), and said two second channels are separated apart by the amount corresponding to the FSR.

36. The multiwavelength simultaneous monitoring circuit as claimed in claim 34, wherein said first comparing means comprises a logarithmic amplifier, and said second comparing means comprises a logarithmic amplifier.

37. The multiwavelength simultaneous monitoring circuit as claimed in claim 34, wherein said first comparing means comprises an A/D converter and a digital signal processor, and said second comparing means comprises an A/D converter and a digital signal processor.

38. The multiwavelength simultaneous monitoring circuit as claimed in claim 34, wherein said first comparing means comprises a differential photodetector, and said second comparing means comprises a differential photodetector.

39. The multiwavelength simultaneous monitoring circuit as claimed in claim 35, wherein said first comparing means comprises a logarithmic amplifier, and said second comparing means comprises a logarithmic amplifier.

40. The multiwavelength simultaneous monitoring circuit as claimed in claim 35, wherein said first comparing means comprises an A/D converter and a digital signal processor, and said second comparing means comprises an A/D converter and a digital signal processor.

41. The multiwavelength simultaneous monitoring circuit as claimed in claim 35, wherein said first comparing means comprises a differential photodetector, and said second comparing means comprises a differential photodetector.

\* \* \* \* \*